(12) United States Patent
Kim et al.

(10) Patent No.: US 12,008,233 B2
(45) Date of Patent: Jun. 11, 2024

(54) ELECTRONIC DEVICE AND METHOD FOR GENERATING A USER-CUSTOMIZED KEYPAD BASED ON USAGE CHARACTERISTICS

(71) Applicant: Samsung Electronics Co., Ltd., Gyeonggi-do (KR)

(72) Inventors: Taekyoung Kim, Gyeonggi-do (KR); Sangheon Kim, Gyeonggi-do (KR); Seongjoon Yoon, Gyeonggi-do (KR); Sangyong Lee, Gyeonggi-do (KR); Jaehan Lee, Gyeonggi-do (KR); Joonhwan Jeon, Gyeonggi-do (KR); Heuijin Jeon, Gyeonggi-do (KR); Yeunwook Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/517,183

(22) Filed: Nov. 2, 2021

(65) Prior Publication Data
US 2022/0121357 A1 Apr. 21, 2022

Related U.S. Application Data

(63) Continuation of application No. PCT/KR2021/014345, filed on Oct. 15, 2021.

(30) Foreign Application Priority Data
Oct. 15, 2020 (KR) .................. 10-2020-0133094

(51) Int. Cl.
*G06F 3/04886* (2022.01)
*G06F 3/04847* (2022.01)

(52) U.S. Cl.
CPC ...... *G06F 3/04886* (2013.01); *G06F 3/04847* (2013.01)

(58) Field of Classification Search
None
See application file for complete search history.

(56) References Cited

U.S. PATENT DOCUMENTS 9,052,821 B2 6/2015 Zhao et al.
2002/0149569 A1* 10/2002 Dutta .................. G06F 3/04886
345/173

(Continued)

FOREIGN PATENT DOCUMENTS

CN 107015748 8/2017
JP 4026479 12/2007

(Continued)

OTHER PUBLICATIONS

International Search Report dated Jan. 20, 2022 issued in counterpart application No. PCT/KR2021/014345, 14 pages.

(Continued)

*Primary Examiner* — William L Bashore
*Assistant Examiner* — Gabriel Mercado
(74) *Attorney, Agent, or Firm* — The Farrell Law Firm, P.C.

(57) ABSTRACT

An electronic device and method thereof are provided, which allow an input device e.g., a keypad or a keyboard) thereof to be customized. The electronic device may include a display module, a processor operatively connected to the display module, and a memory operatively connected to the processor. The memory may store instructions that cause, when executed, the processor to display a UI based on execution of an application, to acquire keypad information and/or user input information from a user input related to a first keypad of the UI, to determine characteristic information for a second keypad based on the acquired information, (Continued)

to organize the second keypad based on the characteristic information, and to display the second keypad through the UI.

18 Claims, 33 Drawing Sheets

(56) References Cited

U.S. PATENT DOCUMENTS

| | | | | |
|---|---|---|---|---|
| 2004/0220943 A1* | 11/2004 | Ross | ............... | G06F 3/0481 |
| | | | | 707/999.102 |
| 2009/0183098 A1* | 7/2009 | Casparian | ............ | G06F 3/0238 |
| | | | | 341/23 |
| 2010/0259561 A1* | 10/2010 | Forutanpour | ......... | G06F 3/0236 |
| | | | | 345/173 |
| 2013/0044063 A1 | 2/2013 | Kim | | |
| 2013/0063357 A1* | 3/2013 | Lee | ............... | G06F 3/0233 |
| | | | | 345/168 |
| 2013/0154937 A1 | 6/2013 | Park | | |
| 2014/0168083 A1* | 6/2014 | Ellard | ............... | G06F 3/041 |
| | | | | 345/168 |
| 2014/0331172 A1* | 11/2014 | Holler | ............... | G06F 3/04842 |
| | | | | 715/803 |
| 2015/0161126 A1 | 6/2015 | Wang et al. | | |
| 2016/0041957 A1* | 2/2016 | Finsterwald | ........... | G06Q 10/10 |
| | | | | 715/202 |
| 2016/0062629 A1* | 3/2016 | Takiguchi | ............... | G06F 3/016 |
| | | | | 715/763 |
| 2016/0188203 A1 | 6/2016 | Fu | | |
| 2017/0205992 A1* | 7/2017 | Paek | ........................ | G06T 7/90 |
| 2017/0357380 A1 | 12/2017 | Gnedin et al. | | |
| 2019/0114074 A1* | 4/2019 | Starkweather | .... | H04M 1/72436 |
| 2019/0171356 A1 | 6/2019 | Kim | | |

FOREIGN PATENT DOCUMENTS

| | | |
|---|---|---|
| KR | 10-0455160 | 11/2004 |
| KR | 10-1123204 | 3/2012 |
| KR | 1020130065965 | 6/2013 |
| KR | 1020130071253 | 6/2013 |
| KR | 1020140019172 | 2/2014 |
| KR | 1020160076394 | 6/2016 |
| KR | 10-1700516 | 1/2017 |
| KR | 1020190065746 | 6/2019 |

OTHER PUBLICATIONS

European Search Report dated Nov. 15, 2023 issued in counterpart application No. 21880586.9-1224, 7 pages.
Indian Examination Report dated Mar. 15, 2024 issued in counterpart application No. 202337009680, 7 pages.

* cited by examiner

FIG. 18
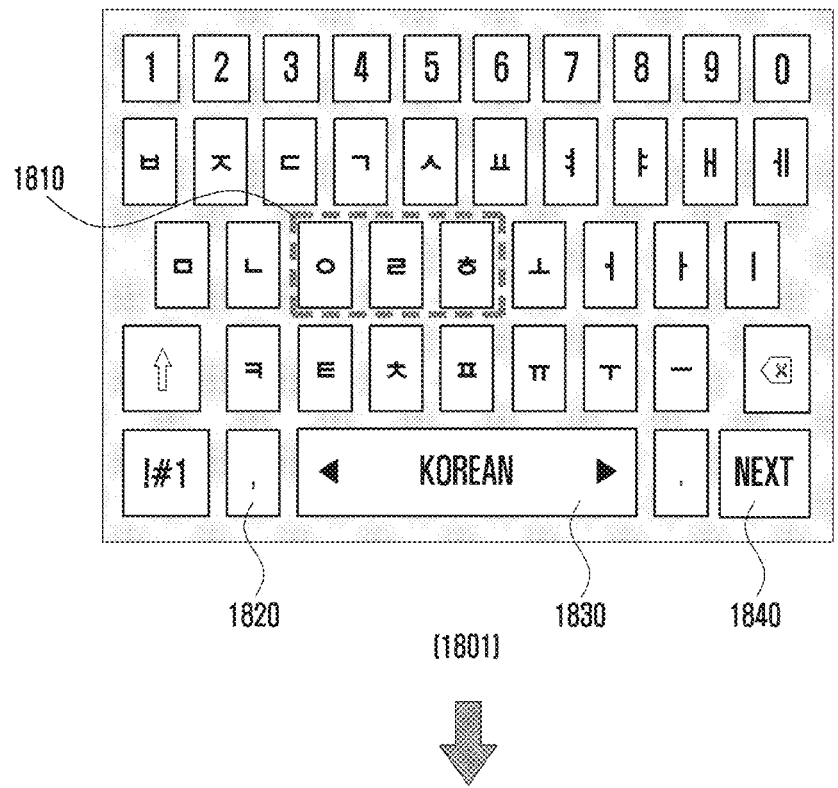
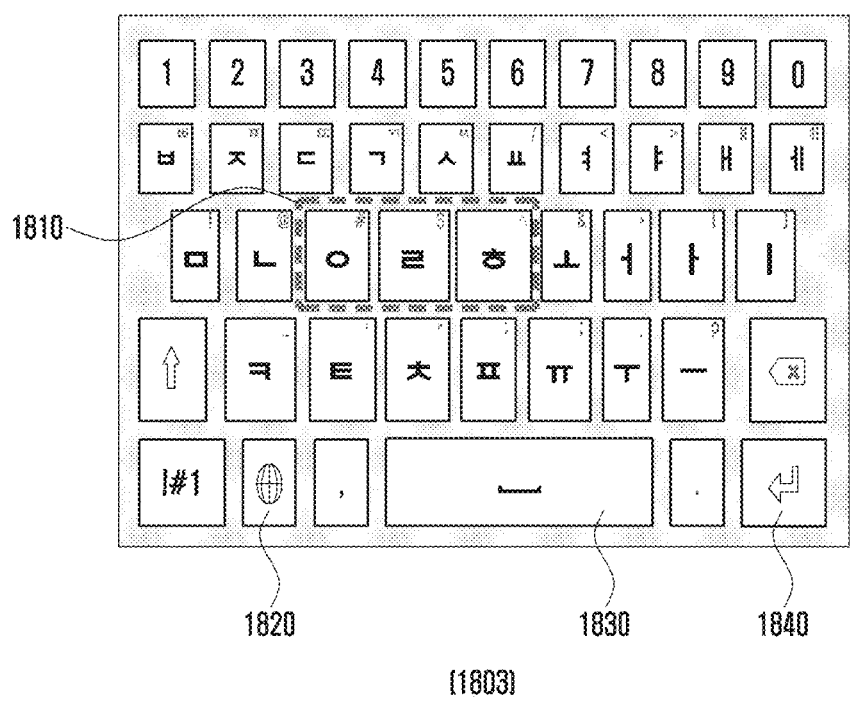

ELECTRONIC DEVICE AND METHOD FOR GENERATING A USER-CUSTOMIZED KEYPAD BASED ON USAGE CHARACTERISTICS

CROSS-REFERENCE TO RELATED APPLICATIONS

This application is a Bypass Continuation Application of International Application No. PCT/KR2021/014345, which was filed on Oct. 15, 2021, and is based on and claims priority under 35 U.S.C. § 119 to Korean Patent Application No. 10-2020-0133094, which was filed in the Korean Intellectual Property Office on Oct. 15, 2020, the entire disclosure of each of which is incorporated herein by reference herein in its entirety,

BACKGROUND

1. Field

The disclosure relates generally to an electronic device allowing an input device (e.g., a keypad or a keyboard) thereof to be customized, and an operating method thereof.

2. Description of Related Art

With the growth of digital technology, a variety of electronic devices such as a mobile communication terminal, a personal digital assistant (PDA), an electronic organizer, a smart phone, a tablet personal computer (PC), and/or a wearable device have become available. In order to support and increase functions of the electronic device, hardware and/or software parts of the electronic device are continuously being improved.

Generally, an electronic device may provide various types of input devices (e.g., a keypad or a keyboard) for supporting a user input. For example, a keypad included in the electronic device may generate various input signals for the operation of the electronic device. The keypad may be displayed through a display of the electronic device and, based on a touch circuit of the display, offer a touch input and/or a hovering input (or proximity input) for a certain location in the keypad. The keypad may also be provided as an input module including various key maps such as a 3*4 key map, a 5*4 key map, a QWERTY key map, and/or a Dvorak key map.

Generally, all keypads are provided similarly (e.g., uniformly) without individual characteristics, and characteristics of each user's keypad usage are not reflected therein. For example, a conventional keypad may have a specific layout, does not support a user's change in layout (e.g., changes in a button position, a button property, a button size, a button function, and/or a button arrangement), and does not support a user-customized keypad configuration that may be more suitable for the user's keypad usage characteristics.

SUMMARY

In accordance with an aspect of the disclosure, a method and apparatus are provided for customizing a keypad of an electronic device depending on a user's usage environment.

In accordance with another aspect of the disclosure, a method and apparatus are provided for customizing a layout, color, and/or effect of a keypad (or keyboard) included in an electronic device.

In accordance with another aspect of the disclosure, a method and apparatus are provided for providing a new keypad layout defined by a user in an electronic device.

In accordance with another aspect of the disclosure, a method and apparatus are provided for learning a user's pattern according to a user's keypad usage in an electronic device and providing a keypad having a user-customized layout based on at least one of the user's pattern and a user's setting.

In accordance with an aspect of the disclosure, an electronic device is provided, which includes a display, a processor, and a memory. The memory stores instructions that, when executed, cause the processor to display a user interface (UI) based on execution of an application, acquire at least one of keypad information or user input information from a user input related to a first keypad of the UI, determine characteristic information for a second keypad based on the acquired information, organize the second keypad based on the characteristic information, and display the second keypad through the UI.

In accordance with another aspect of the disclosure, an operating method is provided for an electronic device, which includes displaying a UI based on execution of an application, acquiring at least one of keypad information or user input information from a user input related to a first keypad of the UI, determining characteristic information for a second keypad based on the acquired information, organizing the second keypad based on the characteristic information, and displaying the second keypad through the UI.

In accordance with another aspect of the disclosure, a nontransitory computer-readable recording medium is provided, which stores instructions that, when executed by a processor of an electronic device including a display, cause the processor to execute operations of displaying a UI based on execution of an application, acquiring at least one of keypad information or user input information from a user input related to a first keypad of the UI, determining characteristic information for a second keypad based on the acquired information, organizing the second keypad based on the characteristic information, and displaying the second keypad through the UI.

Additional applicable scope of the disclosure will become apparent from the detailed description that follows. However, the following detailed description and specific embodiments of the disclosure are given by way of example only because various changes and modifications within the scope of the disclosure can be clearly understood by those skilled in the art.

In addition, various effects explicitly or implicitly appreciated through the disclosure may be provided.

BRIEF DESCRIPTION OF THE DRAWINGS

The above and other aspects, features, and advantages of certain embodiments of the disclosure will be apparent from the following detailed description taken in conjunction with the accompanying drawings, in which:

FIG. 18 illustrates a customized keypad in an electronic device according to an embodiment;

In connection with the description of the drawings, the same or similar reference numerals may be used for the same or similar components.

DETAILED DESCRIPTION

Figure 1:
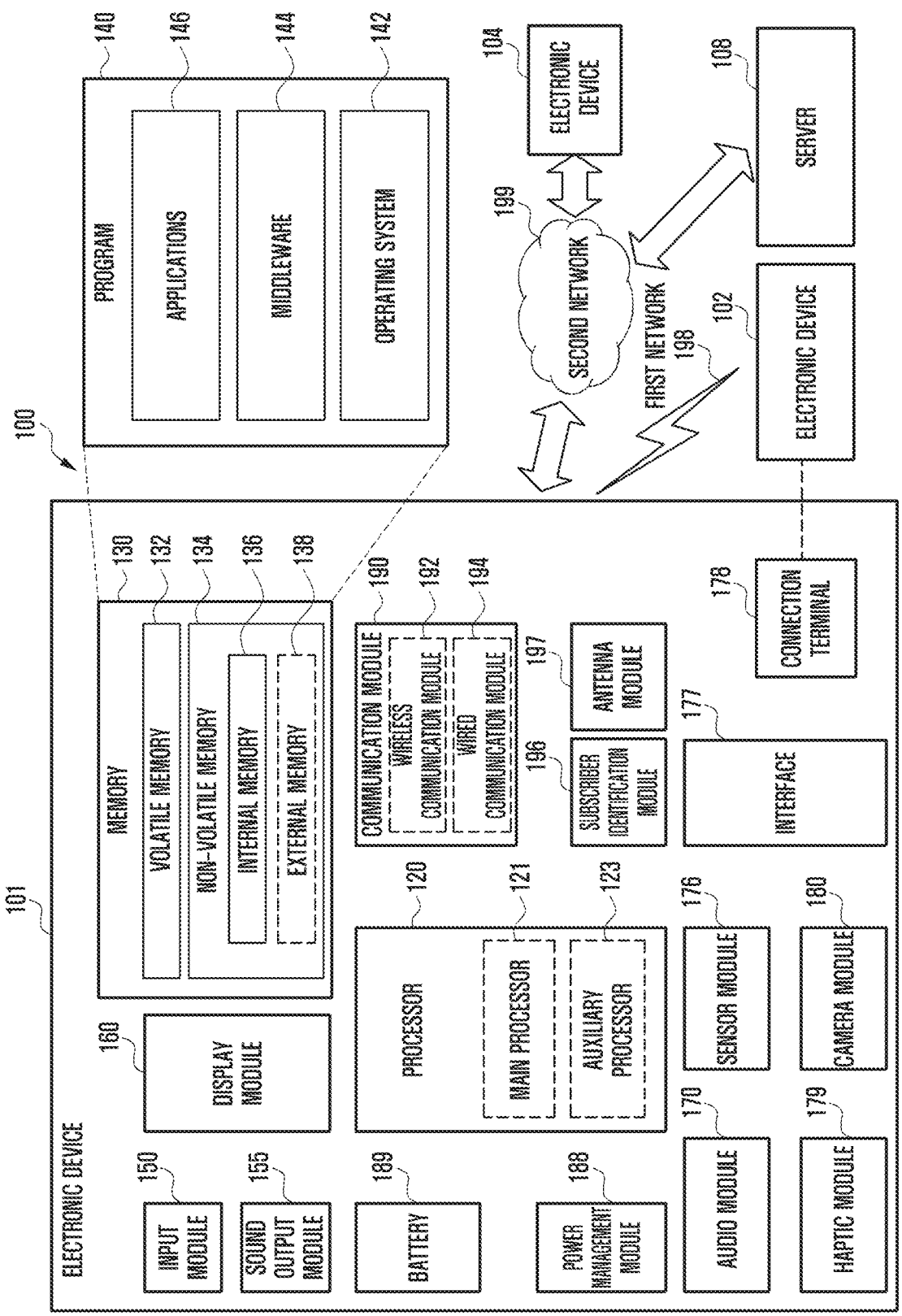
FIG. 1 illustrates an electronic device in a network environment according to an embodiment.

FIG. 1 illustrates an electronic device 101 a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (MC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
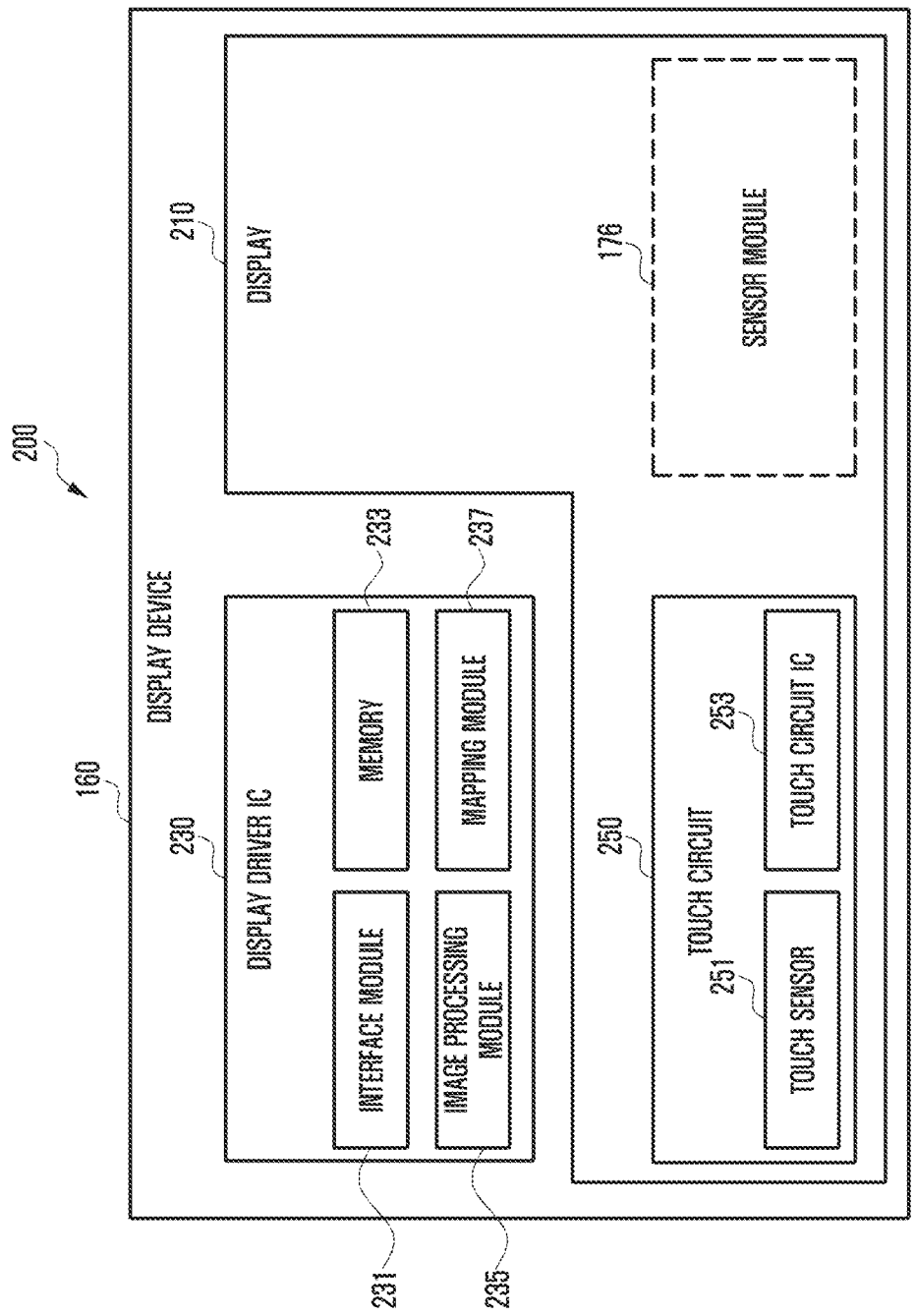
FIG. 2 illustrates a display module according to an embodiment.

FIG. 2 illustrates a block diagram 200 illustrating the display module 160 according to an embodiment.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237.

The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an AP)) or the auxiliary processor 123 (e.g., a GPU) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor integrated circuit (IC) 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage mediums. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
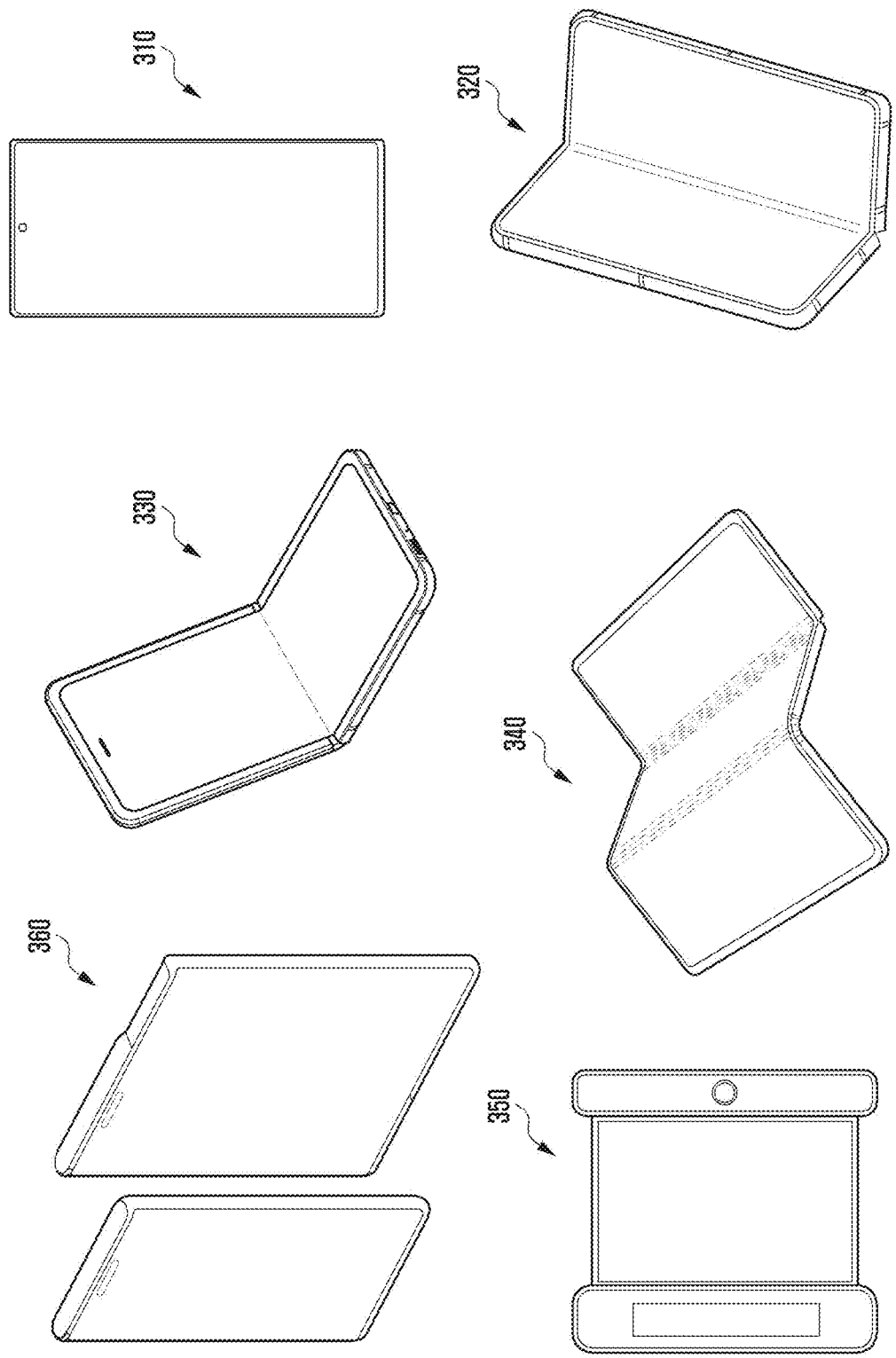
FIG. 3 illustrates examples of an electronic device according to an embodiment.

FIG. 3 illustrates examples of an electronic device according to an embodiment.

Referring to FIG. 3, various form factors of the electronic device may depend on various display types. The electronic device may have various form factors such as a bar type or plate type form factor 310, a foldable form factor 320, 330, or 340, a rollable form factor 350, and/or a slidable form factor 360. The electronic device may be implemented in various forms, and a display may be provided in various schemes depending on the implementation form of the electronic device.

While an electronic device will be described herein as having the foldable form factor (e.g., the foldable electronic device 320, 330, or 310), the electronic device and its operation are not limited thereto. For example, an electronic device may operate with various other form factors such as the bar type or plate type form factor 310, the rollable form factor 350, and/or the slidable form factor 360. The electronic device may be an example of the bar type or plate type electronic device 310, the foldable electronic device 320, 330, or 340, the rollable electronic device 350, or the slidable electronic device 360.

The foldable electronic device 320, 330, or 310 may refer to an electronic device having a display that can be folded in a direction that two different regions thereof substantially face each other or are opposite to each other. Normally, in a portable state, the display of the foldable electronic device 320, 330, or 340 is folded in a direction that two different regions thereof face each other or are opposite to each other, and in an actual use state, the user can unfold the display so that the two different regions form a substantially flat form.

The foldable device 320, 330, or 340 may have a form factor (e.g., 320 or 330) that includes two display surfaces (e.g., a first display surface and a second display surface) based on one folding axis, and/or a form factor 340) that includes at least three display surfaces (e.g., a first display surface, a second display surface, and a third display surface) based on at least two folding axes. This is, however, merely an example, and the number of folding axes applicable to the electronic device in the various embodiments is not limited thereto.

Depending on the implementation form of an electronic device, a display can be folded or unfolded in various schemes (e.g., in-folding, out-folding, or in/out-folding). The electronic device may have various foldable mechanisms such as vertical foldable, horizontal foldable, G foldable, or Z foldable.

As to a default keypad included in the electronic device having various form factors, it is possible to learn a keypad usage pattern corresponding to a user's keypad use and provide a keypad having a user-customized layout based on at least one of a user's pattern and a user's setting. Using the default keypad and/or an application (e.g., a keypad customization application) provided in the electronic device, the user can customize a layout, color, and/or effect of the keypad (or keyboard) set by default in the electronic device.

The user may allow a keypad (e.g., a keypad with a changed layout) customized by a user's setting in the electronic device to be shared with an external electronic device.

Figure 4:
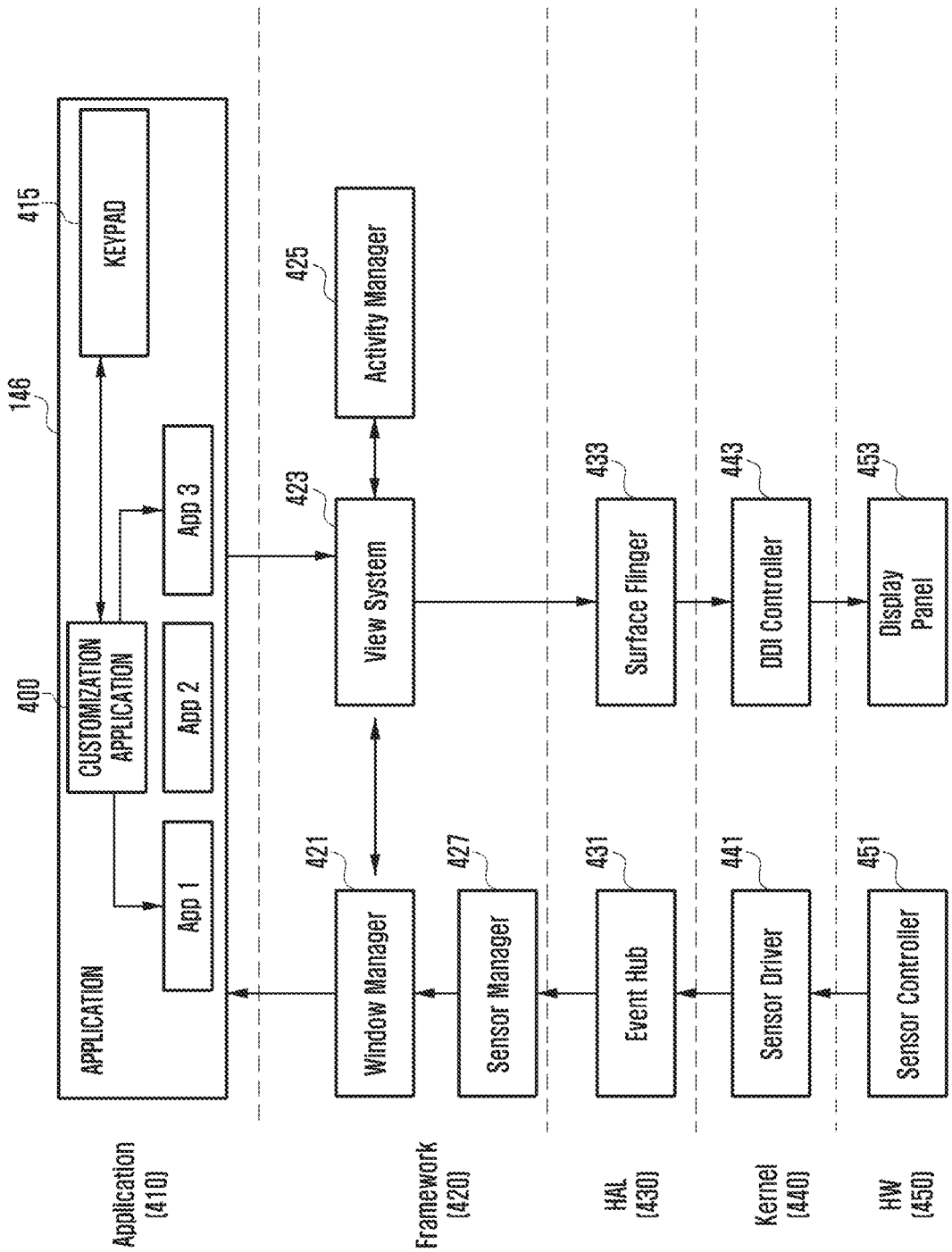
FIG. 4 illustrates a platform architecture of an electronic device according to an embodiment.

FIG. 4 illustrates a platform architecture of an electronic device according to an embodiment.

Referring to FIG. 4, the electronic device may process and manage a keypad customization function based on the platform architecture. The platform architecture of the electronic device may be implemented in software by being executed by a processor and loaded into a memory.

For example, the configuration of the electronic device implemented in software may be divided into an application layer 410, a framework layer 420, a hardware abstraction layer (HAL) 430, a kernel layer 440, and a hardware (HW) layer 450. The configuration in FIG. 4 may be changed at least in part depending on a platform included in the electronic device. For example, at least a part of the platform architecture may be pre-loaded into the electronic device at the time of manufacturing, or downloaded or updated from an external electronic device when being used by the user.

The application layer 410 includes an application 146 and an existing keypad 415 (e.g., HoneyBoard).

The application 146 may draw at least one layer, based on the resolution of the display area of the display module. Using a drawing library (e.g., a view), the application 146 may draw at least one layer based on the resolution of the display area of the display module. The application 146 may include an application stored in the memory of the electronic device or executable or installed by the processor, for example, but is not limited to, a customization application 100, App 1, App 2, and/or App 3.

The application 146 may include various applications executable in the electronic device. For example, the application 146 may include, but is not limited to, a home, dialer, short message service/multimedia messaging service (SMS/MMS), instant message (IM), browser, camera, alarm, contact, voice recognition, email, calendar, media player, album, watch, health (e.g., measurement of biometric information such as exercise amount or blood sugar), or environmental information (e.g., measurement of air pressure, humidity, or temperature) applications.

The application 146 may further include an information. exchange application capable of supporting information exchange between the electronic device and an external electronic device. The information exchange application may include a notification relay application configured to transmit specified information (e.g., data, call, message, or alarm) to an external electronic device, or a device management application configured to manage an external electronic device. The application 146 may include an air action application. The air action application may be an application that provides interaction with the user for setting an air action using an electronic pen (e.g., a stylus pen).

The customization application 400 may be used for customizing (or changing) and applying visual colors and effects as well as the layout of the keypad 415.

The keypad 415 may be an application that supports a user's input to the electronic device. For example, the keypad 415 may generate various input signals for the operation of the electronic device. The keypad 415 may be displayed through the display module and, based on a touch circuit of the display module, provide a touch input and/or a hovering input (or proximity input) for a selected location in the keypad 415. The display module may further include a touch circuit. The touch circuit may include a touch sensor and a touch sensor IC for controlling the touch sensor. The touch sensor IC may control the touch sensor to sense a touch input or a hovering input for a selected location in the display. The touch sensor IC may transmit a signal (e.g., voltage, light quantity, resistance, or electric charge) for a selected location in the keypad 415 displayed through the display module to a processor. The keypad 415 may be implemented in various forms depending on the support of various input modules (or input devices). For example, the keypad 415 may be provided in the form of an input module having at least one of a variety of key maps such as a 3*4 key map, a 5*4 key map, a QWERTY key map, and/or a Dvorak key map. The key map of the keypad 415 may be changed and displayed at least in part (e.g., at least one designated key button and/or the key map structure itself) in response to a user's use of the keypad 415 and/or a designated input.

The keypad 415 may be operatively coupled with the application 146 (e.g., the customization application 400). For example, the keypad 415 may receive an input from the user and provide information based on the input to the customization application 400. The keypad 416 may receive setting information from the customization application 400 and change the existing keypad layout to a layout corresponding to the received information. At least a part of the key map of the keypad 415 may be changed based on the received information.

The keypad 415 may include a size and key map structure for supporting a one-handed use in a certain direction (e.g., left-handed mode or right-handed mode), a size and key map structure for supporting a both-handed use, and/or a size and key map structure for supporting a general use.

The framework layer 420 may provide various functions to the application 146 so that functions or information provided from one or more resources of the electronic device can be used by the application 146. The framework layer 420 includes a window manager 121, a view system 423, an activity manager 425, and/or a sensor manager 427. The framework layer 420 may further include various managers, such as an application manager, a multimedia manager, a resource manager, a power manager, a database manager, a package manager, a connectivity manager, a notification manager, a location manager, a graphic manager, a security manager, a telephony manager, and/or a voice recognition manager.

The window manager 421 may manage one or more graphical UI (GUI) resources used in a screen. The window manager 421 may transmit information in the display area of the electronic device to the application 146. When a change in the state of the electronic device is identified through a sensor module, the window manager 421 may transfer information in the display area corresponding to the changed state of the electronic device to the application 146. When the state change of the electronic device is identified, the window manager 421 may transfer information in the display area corresponding to the changed state of the electronic device to an application having continuity among the applications 146 being executed.

The view system 423 may include a set of extensible views used to create an application UI. The view system 423 may be a program for drawing at least one layer based on the resolution of the display area of the display module. Using a view (e.g., a drawing library), the application 146 may draw at least one layer based on the resolution of the display area of the display module.

The activity manager 425 may manage a life cycle of an activity. The activity manager 425 may manage the execution and termination of the application 146.

The sensor manager 427 may collect and control sensor information based on the usability of the sensor module.

The hardware abstraction layer 430 is an abstraction layer between a plurality of hardware modules included in the hardware layer 450 and software of the electronic device, and includes an event hub 431 and a surface flinger 433. The event hub 431 may be an interface standardizing events occurring in a touch circuit and a sensor circuit. The surface flinger 433 may synthesize a plurality of layers and provide data representing the synthesized layers to a display controller 443. The display controller 443 may refer to a graphic display controller.

The kernel layer 440 may include various drivers for controlling various hardware modules included in the electronic device. The kernel layer 440 includes a sensor driver 441 having an interface module for controlling a sensor controller 451 connected to the sensor module, and a display controller (e.g., a DDI) 443 for controlling a display panel 453 connected the display module.

The hardware layer 450 may include, but is not limited to, a hardware module or configuration (e.g., the sensor controller 451 and the display panel 453) included in the electronic device.

According to an embodiment, an electronic device may include a display module, a processor operatively connected to the display module, and a memory operatively connected to the processor. The memory may store instructions that cause, when executed, the processor to display a UI based on execution of an application, to acquire keypad information and/or user input information from a user input related to a first keypad of the UI, to determine characteristic information for a second keypad based on the acquired information, to organize the second keypad based on the characteristic information, and to display the second keypad through the UI.

The keypad information may include a keypad type, an input pattern, a keypad typographical error, and a frequently used pattern.

The keypad information may be acquired based at least on history information about a user's usage of the first keypad and/or input information about a user input using a keypad provided through the UI.

The user input information may include user's customization information inputted based on the UI.

The instructions may cause the processor to generate a keypad of a layout customized based on the history information and/or the input information, and to organize the second keypad based on user input information related to the generated keypad.

The characteristic information may include information related to a theme, a skin, an attribute, and/or a layout related to keypad customization.

The instructions may cause the processor to perform mapping of a key map for each keypad.

The instructions may cause the processor to provide through the UI the second keypad in which a first layout of the first keypad is customized to a second layout based on the characteristic information.

The instructions may cause the processor to set the second keypad as a default keypad of the electronic device, and to share the second keypad with an external electronic device based on a user input requesting sharing of the second keypad.

The instructions may cause the processor to share the characteristic information organizing the second keypad with the external electronic device through a specified file format and a specified communication scheme.

The first keypad may include an existing keypad set based on a first layout to be used by a user in the electronic device, and the second keypad may include a keypad in which the first layout of the first keypad is customized to a second layout through the UI, and added as a user keypad.

According to an embodiment, a non-transitory computer-readable recording medium may store instructions that cause, when executed by a processor of an electronic device including a display module, the processor to execute operations of displaying a UI based on execution of an application, acquiring keypad information and/or user input information from a user input related to a first keypad of the UI, determining characteristic information for a second keypad based on the acquired information, organizing the second keypad based on the characteristic information, and displaying the second keypad through the UI.

Hereinafter, an operating method of an electronic device according to various embodiments will be described in detail. Operations performed by the electronic device to be described below may be executed by a processor including at least one processing circuitry of the electronic device. Operations performed by the electronic device may be carried out by instructions that are stored in the memory and cause, when executed, the processor to operate.

Figure 5:
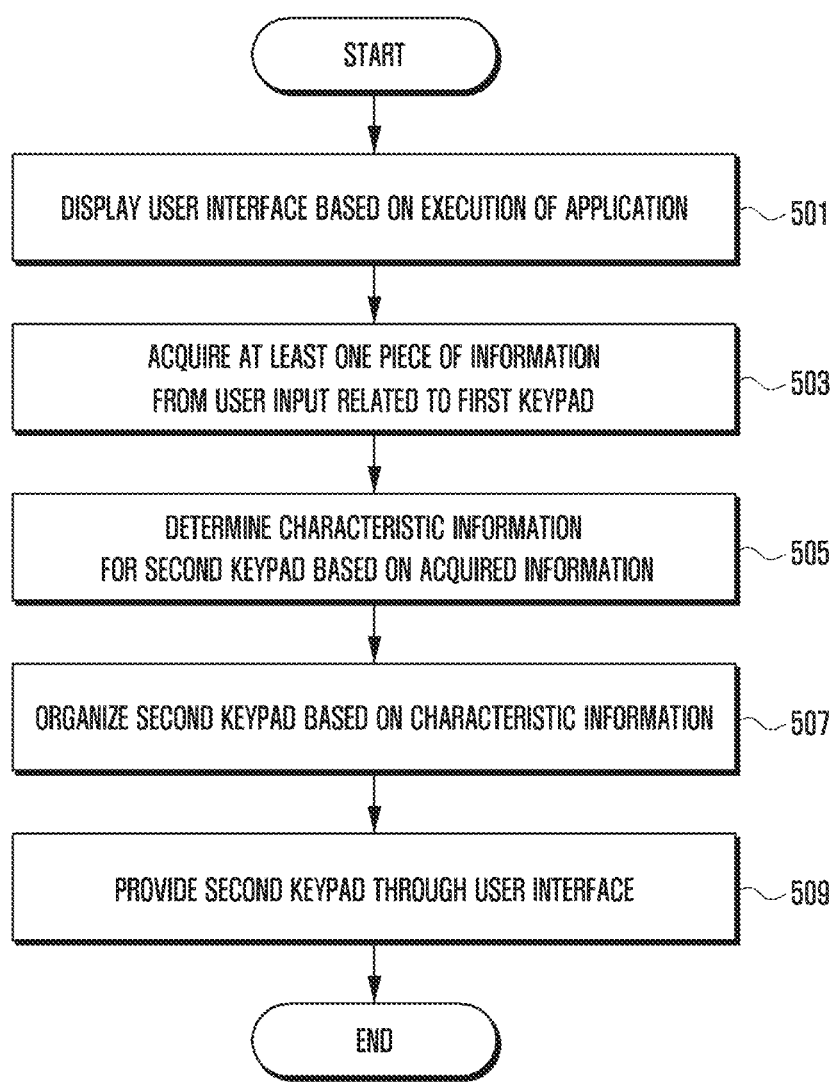
FIG. 5 is a flow diagram illustrating an operating method of an electronic device according to an embodiment.

FIG. 5 is a flow diagram illustrating an operating method of an electronic device according to an embodiment.

Referring to FIG. 5, in step 501, the electronic device (or a processor thereof) displays, based on the execution of an application, a UI (or an execution screen) of the application. For example, the user may enter a user input (e.g., selecting (e.g., touching) an application icon) to execute the customization application 400 for customizing the keypad 415 in FIG. 4. Based on the user input, the processor may execute the customization application 400 and control the display module to display the UI (or execution screen) provided by the customization application 400.

Figure 6A:
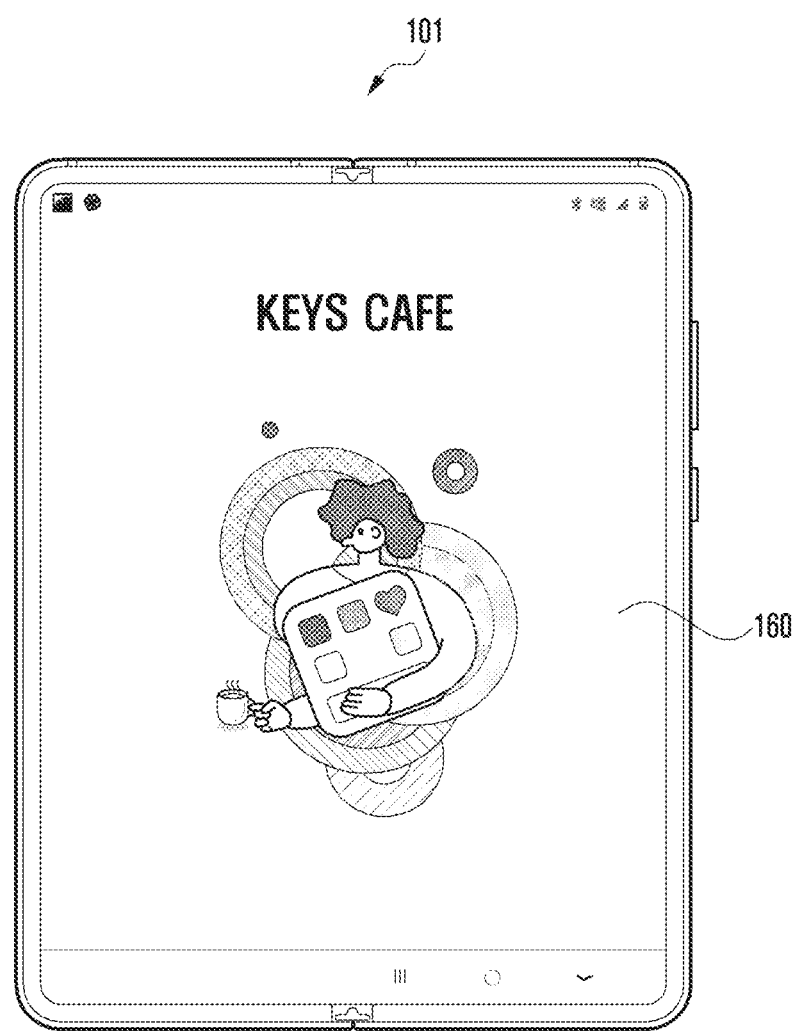
FIGS. 6A and 6B illustrate a UI of an application supporting keypad customization in an electronic device according to an embodiment.
Figure 6B:
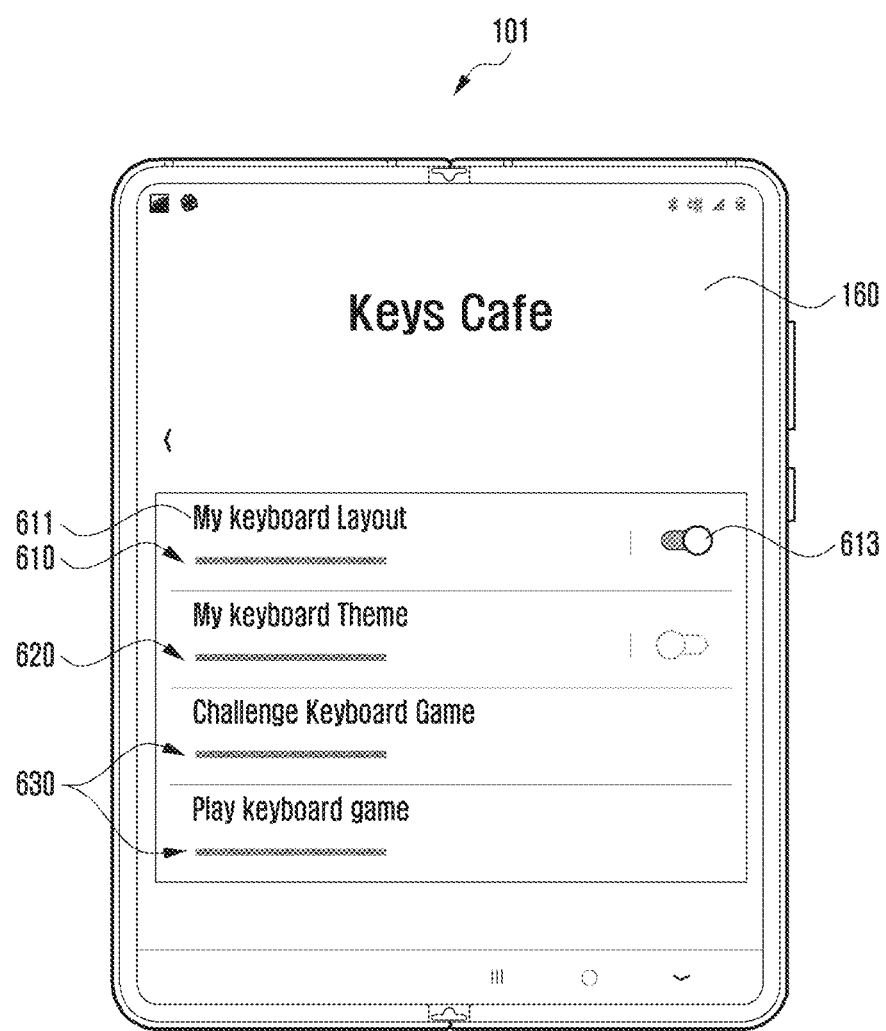

FIGS. 6A and 6B illustrate a user interface of an application (e.g., a customization application) supporting keypad customization in an electronic device according to an embodiment.

In step 501, the processor may display the execution screen of the customization application 400 through the display module 160 as illustrated in FIGS. 6A and 6B. The screen shown in FIG. 6A represents an example of an executing screen (e.g., a loading screen) while the customization application 400 is preparing to be executed (e.g., a loading state). The screen shown in FIG. 6B represents an example of an initial execution screen (e.g., initial screen) while the customization application 400 is executed (e.g., an execution state).

Referring to FIG. 6B, the initial screen (or UI) of the customization application 400 includes a first item 610 including an object 611 for switching (e.g., entering a custom layout mode) to a UI for changing the layout of the keypad 415, an object 613 for selecting activation/inactivation of a customization function, a second item 620 for switching (e.g., entering a theme change mode) to a UI for changing a theme of the keypad 415, and a third item 630 for switching to a UI for collecting a user's input pattern through various games (e.g., a typing game, an acid rain game) using the keypad 415.

Referring again to FIG. 5, in step 503, the processor acquires at least one piece of information from a user input related to a first keypad. The at least one piece of information may include keypad information and/or user input information (e.g., user's customization information). The keypad information may include a keypad type, an input pattern (e.g., a typing speed), a keypad typographical error, and a frequently used pattern (e.g., a keypad touch region, a left-handed use pattern, and/or a right-handed use pattern). The user input information may include user's customization information inputted based on the UI of the customization application 400. The processor may acquire the keypad information from a first user input using the first keypad provided through the UI, and acquire the customization information from a second user input related to the customization setting provided through the UI.

In step 505, the processor determines characteristic information for a second keypad, based on the acquired information. The processor may determine the characteristic information and map the characteristic information to the keypad, based at least on the keypad information acquired from the user input and/or the user input information (e.g., the user's customization information). The characteristic information may include information for organizing the second keypad through customization of the first keypad, such as themes, skins, attributes, and/or layouts a button size and/or a spacing between buttons). The processor may determine the characteristic information of the keypad 415. The processor may generate a key map and perform mapping for one or more buttons (or keys) of the keypad 415, For example, assuming that the keypad is a QWERTY keypad or a single-vowel keypad, the Korean character 'ᄈ' can be entered with 'shift+ᄇ' in the QWERTY keypad and can be entered with 'ᄇ+ᄇ' in the single-vowel keypad. As such, the processor may generate a key map corresponding to each keypad and perform mapping. As another example, in case of a language other than Korean, the processor may generate a key map and perform mapping in real time when processing basic information of the keypad.

The processor may predict and simulate a typographical error rate through learning in order to determine whether a newly mapped keypad (e.g., a customized keypad or a dynamic keypad) is actually effective, Such learning may refer to reinforcement learning and/or deep learning The processor may predict a typographical error rate by modeling various learning patterns and applying a newly generated keypad to modeling. In order to determine how much data is required for the newly generated keypad to be effective, the processor may analyze, predict, and generate sample sentences or the amount of sample sentences in which all buttons (or keys) can be pressed (or touched). Analyzing may refer to reinforcement learning and/or deep learning based learning models.

In step 507, the processor organizes the second keypad based on the characteristic information. The processor may organize, from the first keypad, the second keypad customized based on the characteristic information. The processor may customize a first layout of the first keypad to a second layout of the second keypad to which the characteristic information is applied. The first keypad may include an existing keypad set to be used by the user in the electronic device, and be organized based on the first layout set in the existing keypad. The second keypad may include a user keypad (e.g., a user-customized keypad) to which the first layout of the first keypad customized through a UI is added, and may be organized based on the second layout customized according to the characteristic information.

In step 509, the processor provides (e.g., displays) the second keypad through the UI. The processor 120 may display the second keypad through the UI and thereby recommend it to the user. The processor may control the display module 160 to display a recommended keypad based on information acquired from a user input. The processor may recommend and display a keypad based on the characteristic information and/or the user input information (e.g., customization information).

While the recommended second keypad is displayed through the display module 160, the processor may customize the second layout of the second keypad again based on user input information (e.g., user's additional customization information) related to the second keypad. Based on a user input (e.g., a setting completion input) using the second keypad, the processor may change and/or set the use-set keypad from the first keypad to the second keypad.

The processor may share the second keypad with another electronic device, based on a user input. The processor may provide (or transmit) the characteristic information organizing the second keypad to an external electronic device through a designated communication scheme.

Figure 7:
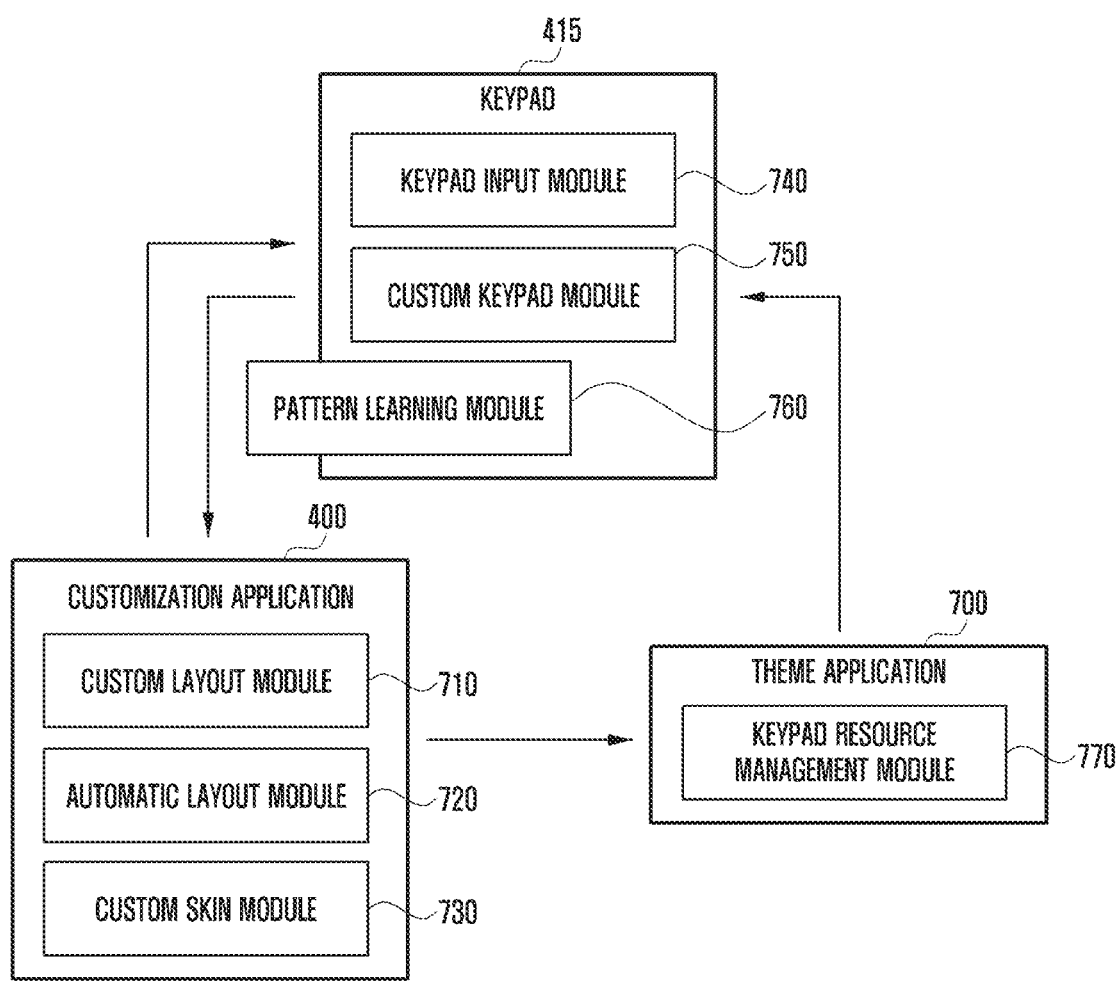
FIG. 7 illustrates an interaction for keypad customization in an electronic device according to an embodiment.

FIG. 7 illustrates an interaction for keypad customization in an electronic device according to an embodiment. Specifically, FIG. 7 illustrates an interaction for keypad. customization between a module for keypad customization in an application for providing keypad customization (e.g., the customization application 400 in FIG. 4) and a module of an existing keypad 415.

Referring to FIG. 7, the customization application 400 includes keypad customization modules such as a custom layout module (CLM) 710, an automatic layout module (ALM) 720, and/or a custom skin module (CSM) 730. The customization application 400 may also include a custom theme module (CTM) and a custom setting module (CSET).

The keypad 415 includes modules such as a keypad input module (KIM) 740 responsible for input of the keypad 415, a custom keypad module (CKM) 750 responsible for customization of the keypad 415, and/or a pattern learning module (PLM) 760 responsible for learning user usage patterns and storing keypad information (or primary information).

The application 146 furthers include a theme application 700 (e.g., theme park) for customizing the keypad 415 (e.g., changing a theme). The theme application 700 includes a keypad resource management module 770 (e.g., a theme park keyboard resource manager (TKRM)) for managing (or applying) keypad resources through the theme application 700.

While acquiring information related to customization of the keypad 415 based on a UI, the customization application 400 may receive keypad information (or primary information) from the keypad 415 and receive user input information (or secondary information) based on the UI provided by the customization application 400. For example, the user input information may be directly input by the user in the CLM 710 of the customization application 400 or collected through typing in the ALM 720.

The keypad 415 may receive, through the PLM 760, the keypad information (or primary information) such as a keypad type, a keypad typing speed, a keypad touch region, an input pattern frequently used by the user, a typographical error, a user's frequently used pattern, and a usage mode frequently used by the user (e.g., a left-handed mode, a right-handed mode, and a both-handed mode). The keypad 415 may represent the existing keypad before a keypad customized through the customization application 400 is applied. For example, the represented keypad may be a keypad set in and provided to the electronic device, such as a QWERTY keypad, a single-vowel keypad, a Naratgul keypad, a Chunjiin keypad, and/or a Moakey keypad.

The customization application 400 may receive, from the keypad 415, the keypad information (or primary information) acquired by the keypad 415.

The CLM 710 of the customization application 400 may provide a keypad (or keyboard) layout preset. For example, the CLM 710 may provide a preset for each language and/or for each input type. The CLM 710 may manage presets and user-sets. For example, the CLM 710 may support allowing the user to arbitrarily change the layout of the keypad 415 such as moving a button (or key), adjusting a row/column size, adjusting a button size, and/or modifying a button attribute. The CLM 710 may collect the user input information (or secondary information) according to a user's additional input together with the keypad information (or primary information).

The ALM 720 of the customization application 400 may provide a specified sample sentence, analyze an input (e.g., touch) pattern based on information inputted (e.g., typed) using the keypad 415 by the user in response to the sample sentence, and. recommend a custom layout based on the analysis result. The ALM 720 may collect and store the user input information (or secondary information) (e.g., touch pattern) typed according to a given sample sentence, and recommend a keypad of the custom layout (e.g., a second layout) based on the user input information. The ALM 720 may receive the keypad information of the keypad 415 from the keypad 415, and receive the user input information (e.g., size and touch information of a keypad (e.g., a button being typed)) corresponding to a user's input (e.g., typing). The customization application 400 may analyze the received user input information, generate a new model (or layout) in which a button size is adjusted by mapping the keypad information and/or the user input information, and recommend it to the user. When there is no keypad information (or primary information), the ALM 720 may generate a new model using only the user input information (or secondary information).

The ALM 720 may collect and manage the user input information (or secondary information). The user input information (or secondary information) collected by the ALM 720 may include various kinds of characteristic information such as words that the user frequently misses, words that the user frequently clicks (or touches), a left-handed use, and/or a right-handed use, and the ALM 720 may determine such characteristic information. For example, if there is a high probability of a misspelling of "초" of "화초" in the sample sentence "화초 화초장", additional samples related to "초" may be continuously provided. For example, the ALM 720 may continuously output related words and/or sentences "화초", "초록" and "초장", and determine a user's typographical error pattern.

The ALM 720 may perform an operation related to data collection (e.g., basic information processing of a keypad, normal touch data processing, and/or typographical error processing) and/or a touch correction operation.

The CSM 730 of the customization application 400 may provide the user with various types of UIs and effects. The CSM 730 may provide optimal skin (or theme) information suitable for a user's pattern in response to data analyzed based on the keypad information (or primary information) and/or the user input information (or secondary information). The information related to the user's pattern may include information about a typographical error, a keypad type, and/or a form factor (e.g., foldable or slidable) of the electronic device.

The customization application 400 may include a module (e.g., a CTM) capable of applying a theme resource through the theme application 700 so as to achieve a visual harmony of various additional functions (e.g., emotion, sticker, and/or gif) provided by the keypad 415. The theme application 700 or its operation may be implemented by being included in the customization application 400.

The customization application 400 may include a module (e.g., a CSET) capable of storing and managing various types of setting information and/or pattern information of the user.

Figure 8A:
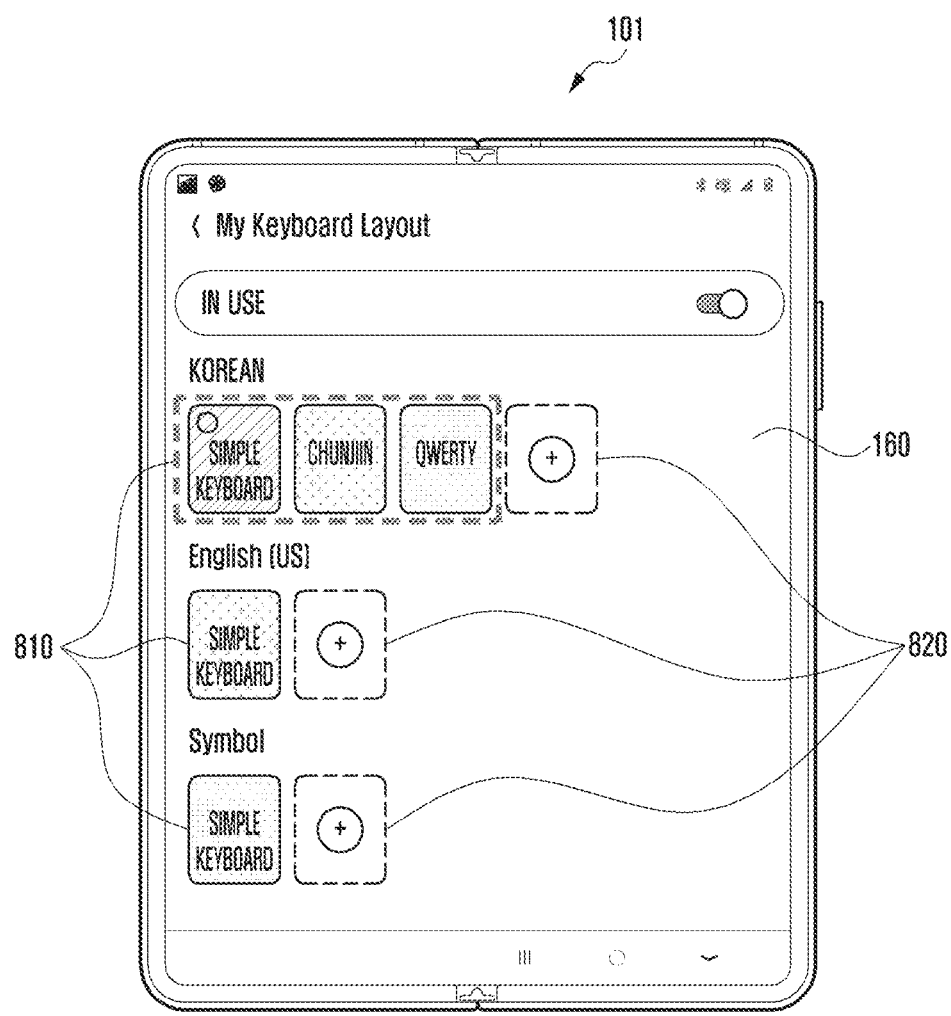
FIGS. 8A, 8B, and 8C illustrate a UI for keypad customization in an electronic device according to an embodiment.
Figure 8B:
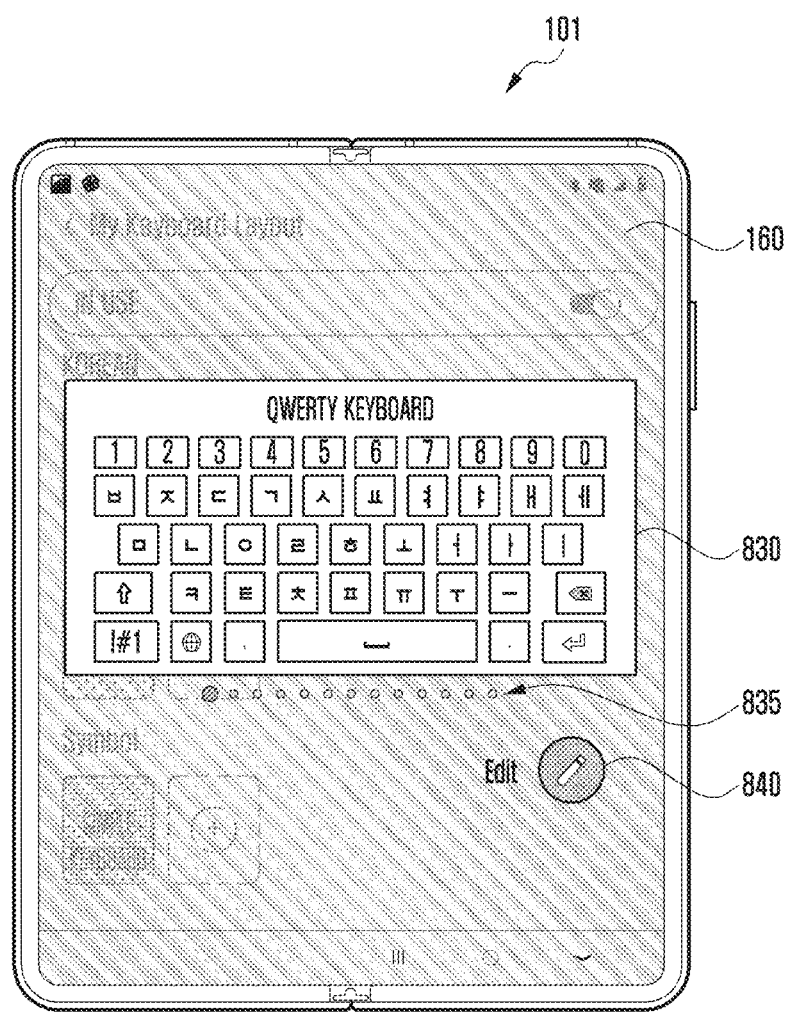
Figure 8C:
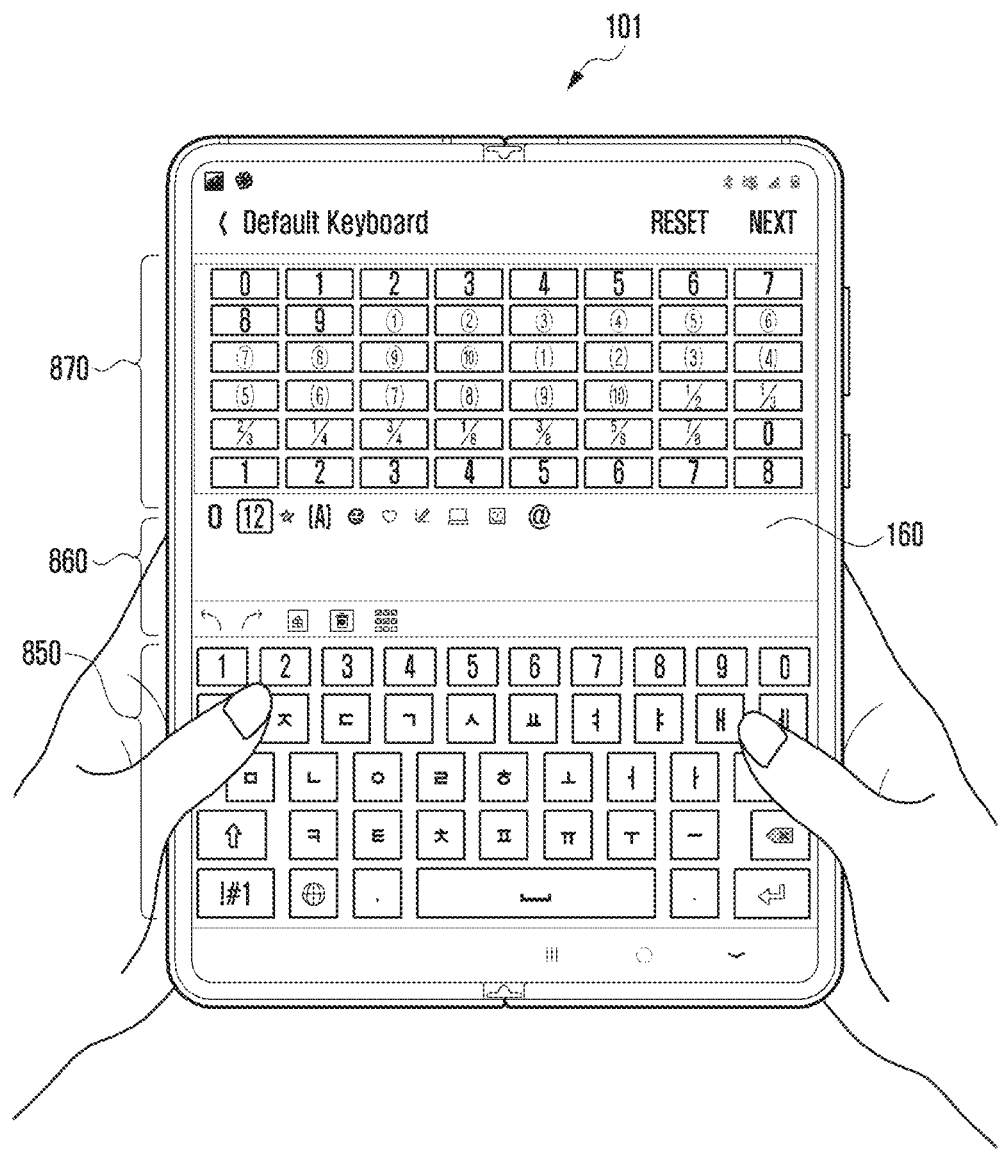

FIGS. 8A, 8B, and 8C illustrate examples of a UI for keypad customization in an electronic device according to an embodiment.

For example, FIGS. 8A, 8B, and 8C illustrate examples of a UI (or execution screen) of the customization application 400 or examples of the execution screen of the CLM 710 of the customization application 400.

Referring to FIGS. 8A, 8B, and 8C, FIG. 8A illustrates an example of a preset interface that provides a preset keypad configurations for each language and/or each input type. As shown, for each language (e.g., Korean, English) and each input type (e.g., symbol), there may be a predefined preset 810 and an additional object 820 for user definition (or addition). For example, at least one keypad preset may be provided for each language, and at least one keypad preset may be provided for each input type.

FIG. 8B illustrates a screen appearing when the additional object 820 for user definition is selected in FIG. 8A. Specifically, FIG. 8B illustrates a keypad UI that contains a keypad object 830 corresponding to one or more existing keypads set in the electronic device 101 and an execution object (or edit object) 840 for executing keypad customization corresponding to the selected keypad object 830. The keypad object 830 may correspond to a keypad that supports Korean among the existing keypads set in the electronic device 101 when the additional object 820 is selected from the Korean item (or tab) in FIG. 8A. For example, if there are a plurality of keypads supporting Korean, a plurality of corresponding keypad objects 830 may be provided, or one keypad object 830 may be displayed as shown, and the other hidden keypad objects may be provided to be selectable through a scroll (or slide) (e.g., left and right scroll). The electronic device 101 may provide guide objects 835 (or a scroll object) indicating that the plurality of keypad objects 830 can be scrolled. Each guide object 835 may be mapped to correspond to the plurality of keypad objects 830 and provided in a one-to-one format, Based on a user's selection input (e.g., swipe in the left or right direction), the electronic device 101 may slide out the currently displayed keypad object 835 and instead slide in the other hidden keypad object to be displayed.

FIG. 8C illustrates a screen appearing when the execution object 840 for customizing the keypad is selected in FIG. 8B. Specifically, FIG. 8C illustrates a customization interface for customizing the keypad corresponding to the selected keypad object 830. The customization interface includes a keypad region 850 for the keypad corresponding to the selected keypad object 830, a customization region 860 for customization of the keypad and related information, and/or a template region 870 for various templates for changing button attributes of the keypad.

The keypad region 850 may be provided with the keypad corresponding to the selected keypad object 830. The keypad may be provided in an initial default layout (e.g., a first layout), which may be changed to a customized layout (e.g., a second layout) according to a user's customization progress. The illustrated example may be a screen example that customization is being performed while the layout of the keypad is changed at least in part (e.g., at least some buttons of the keypad are changed to buttons for inputting icons (or emoticons)).

The customization region 860 may provide related information and edit menus (or options) for moving buttons (or keys) of the keypad displayed in the keypad region 850, adjusting column sizes, and/or adjusting button sizes.

Figure 9A:
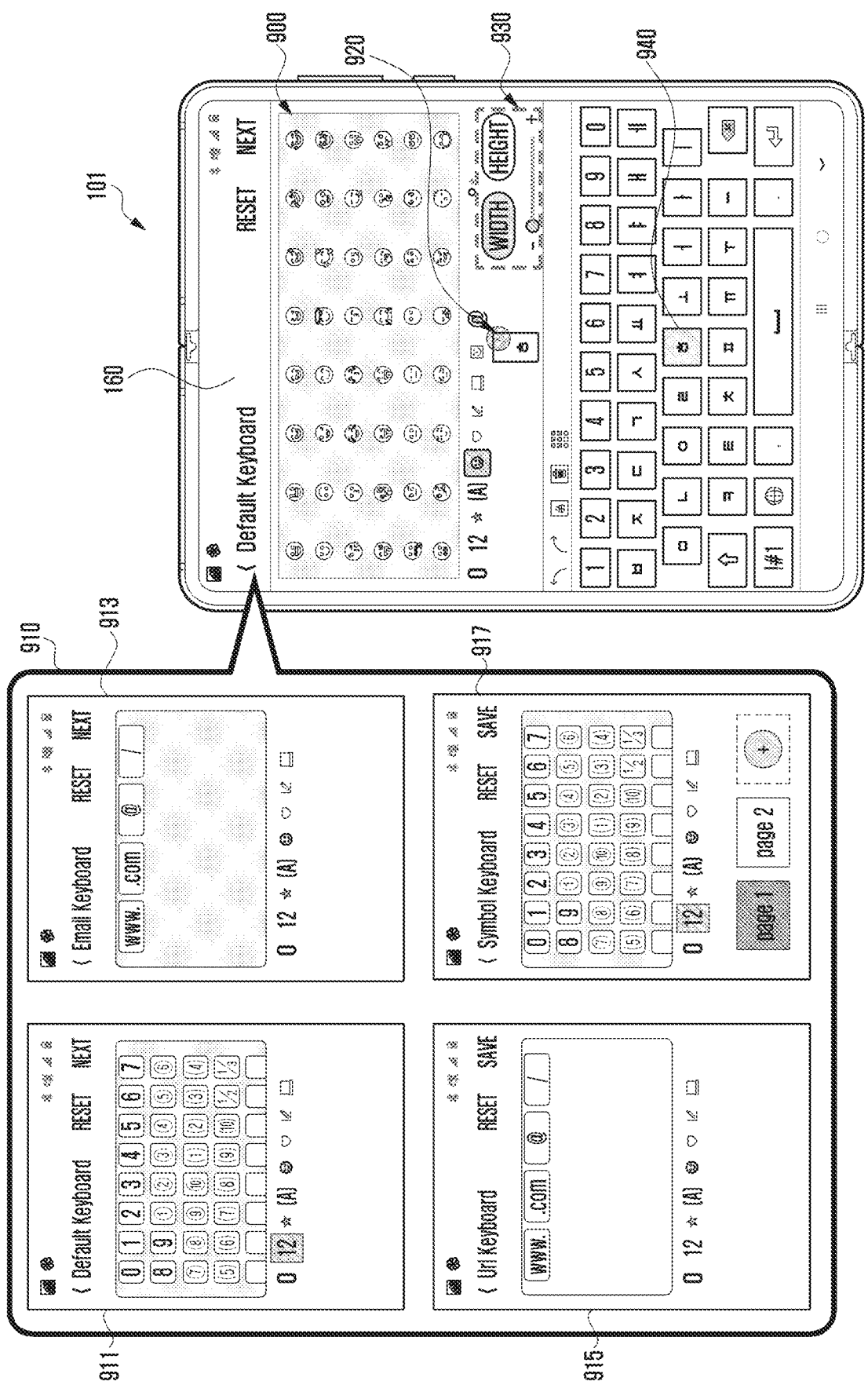
FIGS. 9A and 9B illustrate a UI for keypad customization in an electronic device according to an embodiment.
Figure 9B:
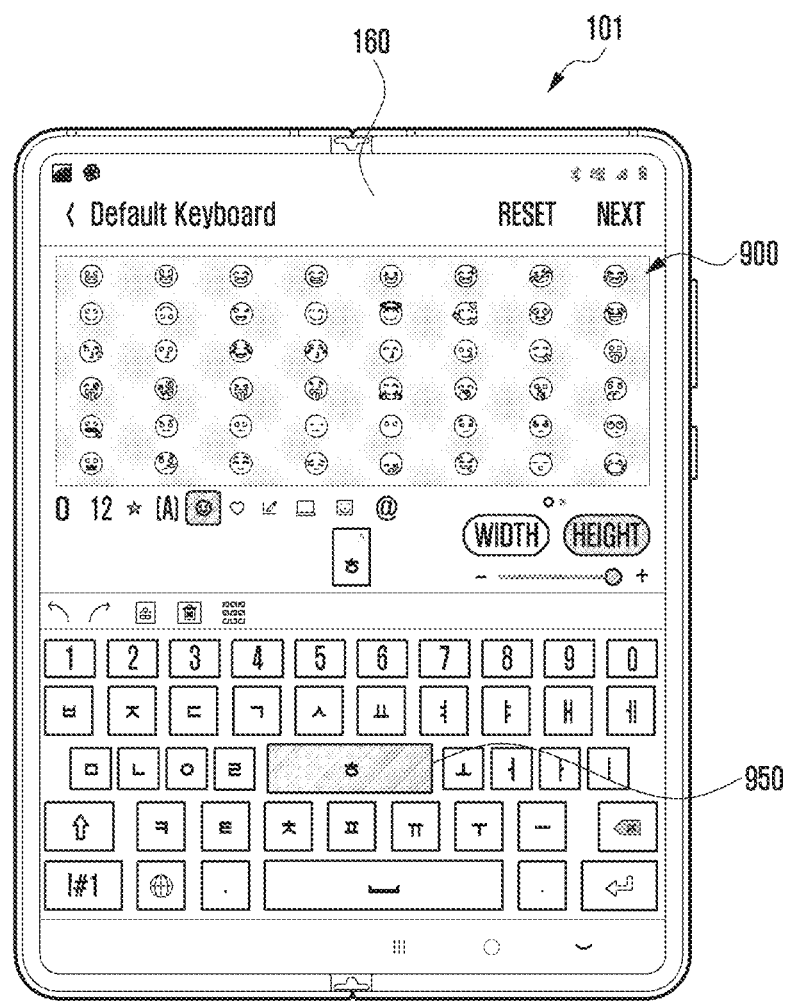

FIGS. 9A and 9B illustrate a UI for keypad customization in an electronic device according to an embodiment.

Referring to FIGS. 9A and 9B, the customization region may contain an information object 920 corresponding a button 940 in FIG. 9A and a size adjustment object 930 for adjusting the size of the selected button 940. The size adjustment object 930 may be configured to be able to adjust the horizontal size (e.g., width) of the button and/or the vertical size (e.g., height) of the button.

In response to a user input using the size adjustment object 930, the size (e.g., width) of the selected button 940 may be adjusted as shown in a button 950 of FIG. 9B. Although the illustrated example is to adjust the size of a single button (or single key). this is only an example. For example, the user may select a plurality of buttons (e.g., two or more or all buttons) for size adjustment in the keypad region and adjust the sizes of the plurality of selected buttons to substantially the same size at the same time.

The customization region may also provide information objects and adjustment objects related to button movement, button spacing adjustment, button column size adjustment, and/or button row size adjustment, and/or provide a deletion (or removal) object for deleting one or more selected objects.

The template region may provide various templates for changing button attributes for respective buttons in the keypad region. In FIG. 9A, an icon template 900 is displayed for changing the attribute of a button to an icon (or emoticon) in the template region. The template region may provide various templates for respective functions as indicated by an element 910 in FIG. 9A. For example, various templates classified by functions (or uses) applicable as button attributes may be provided through the template region. The templates classified by functions (or uses) applicable as button attributes include a default template 911, an email template 913, a URL template 915, and/or a symbol template 917.

The user may select an object in the template region, move the selected object to a desired button in the keypad region, and then drop the moved object (e.g., a drag and drop input) so as to change the attribute of the corresponding button to the attribute of the selected object. The user may select an object in the template region, move the selected. object to an empty area between buttons in the keypad region, and drop the moved object so as to add a new button of the selected object in the keypad region. The electronic device 101 (e.g., the customization application 400 or the CLM 710) may change the attribute of a desired button or add a new button in the keypad region in response to a user input.

As illustrated in FIGS. 9A and 9B, the electronic device 101 may provide presets for various languages and/or input types, change the layout of the keypad in response to a user input (e.g., button movement, column size adjustment, button size adjustment, and/or button attribute change) using the presets, and collect the user input information (or secondary information) according to the layout change.

Figure 10:
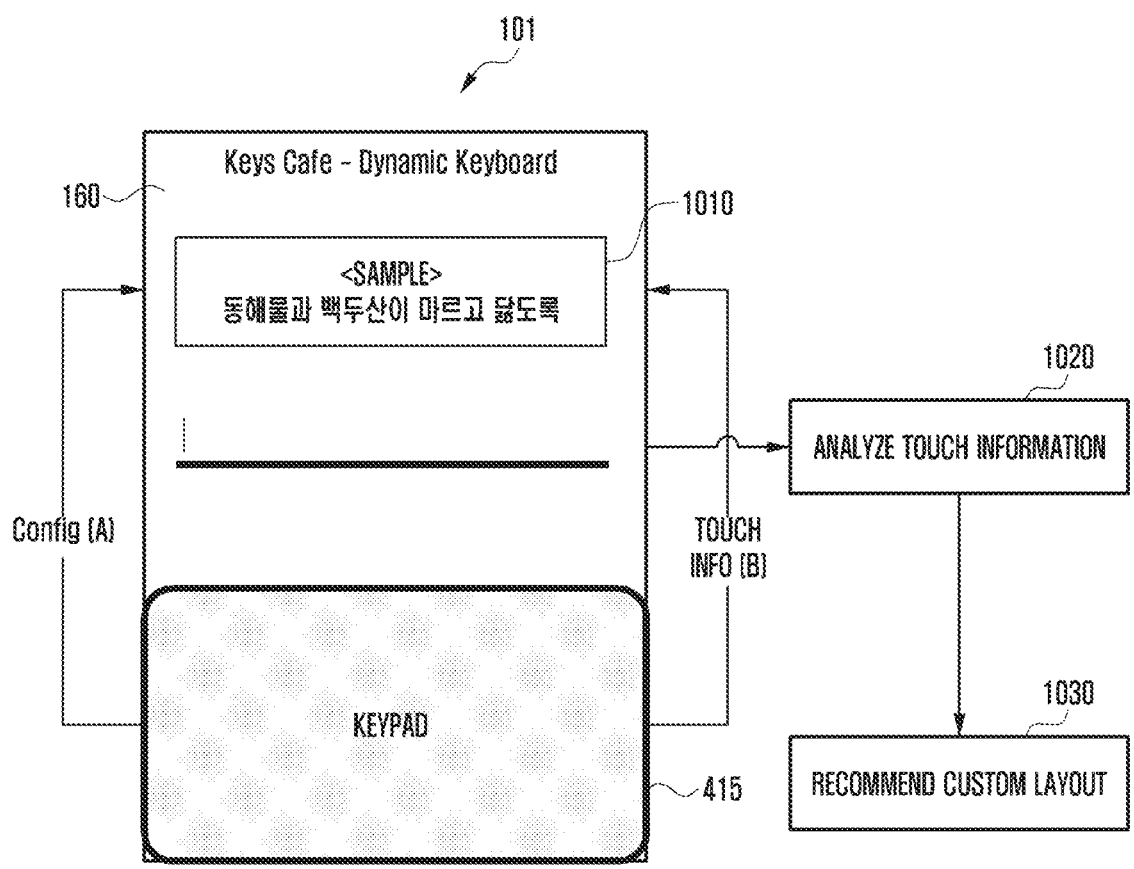
FIG. 10 illustrates a UI for keypad customization and an operating mechanism thereof in an electronic device according to an embodiment.

FIG. 10 illustrates a UI for keypad customization and an operating mechanism thereof in an electronic device according to an embodiment. Specifically, FIG. 10 illustrates an example of a UI (or execution screen) of the customization application 400, or an example of a UI that allows the ALM 720 of the customization application 400 to acquire user input information, and a related operation.

Referring to FIG. 10, the electronic device 101 (e.g., the customization application 400 or the ALM 720) provides a designated sample sentence 1010, analyzes (1020) touch information (B) (e.g., a touch pattern) input (e.g., typed) by the user through the keypad 415 in response to the sample sentence 1010, and recommends (1030) a custom layout based on the analysis result. The customization application 400 may collect and store user input information (or secondary information) (e.g., touch pattern) typed according to the sample sentence 1010, and recommend a keypad of a custom layout (e.g., a second layout) based on the user input information.

The customization application 400 may receive keypad information (e.g., config (A)) from the keypad 415, and receive user input information the size of a keypad (e.g., a typed button) and touch information (B)) corresponding to a user input (e.g., typing). The customization application 400 may analyze the received user input information, generate a new model (or layout) in which a button size is adjusted through mapping of the keypad information and/or the user input information, and recommends it to the user. When there is no keypad information (or primary information), the customization application 400 may generate a new model using only the user input information (or secondary information).

Figure 11:
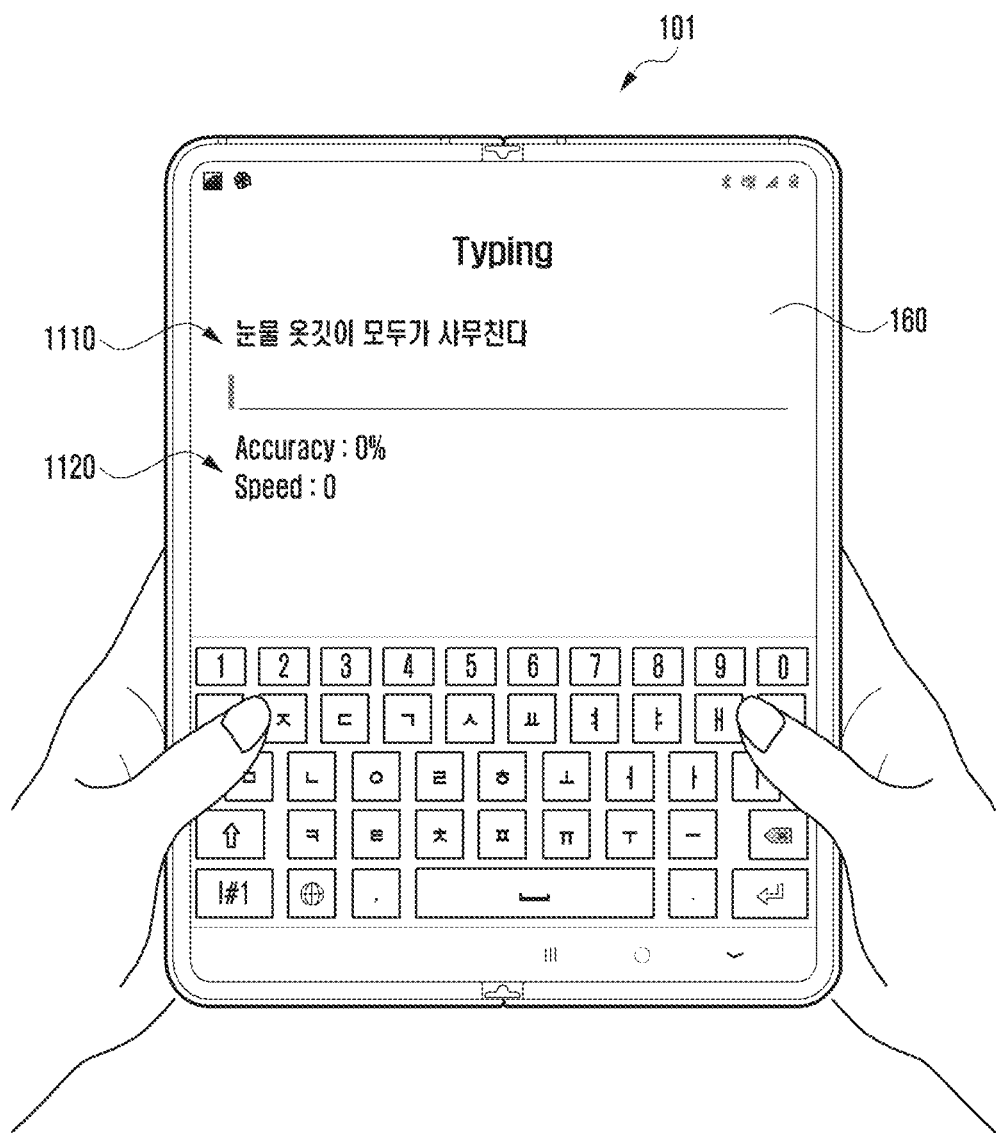
FIG. 11 illustrates a UI for keypad customization in an electronic device according to an embodiment.

FIG. 11 illustrates a UI for keypad customization an electronic device according to an embodiment. Specifically, FIG. 11 illustrates an example of a UI (or execution screen) of the customization application 400 as shown in FIG. 10, or an example of an execution screen of the ALM 720 that allows the ALM 720 of the customization application 400 to acquire user input information.

Referring to FIG. 11, the electronic device 101 (e.g., the customization application 400 or the ALM 720) may collect user input information (or secondary information) based on the illustrated UI. For example, the customization application 400 may collect typographical errors, pattern information, and/or typing speed based on information that the user types in response to a given sample sentence 1110.

The user input information may include various kinds of characteristic information such as words that the user frequently misses, words that the user frequently clicks (or touches), a left-handed use, and/or a right-handed use, and the customization application 100 may determine such characteristic information. For example, if there is a high probability of a misspelling of "초" in the sample sentence "화초", the customization application 100 may determine a typographical error pattern through continuously providing additional samples related to "초" (e.g., and "화초", "초복" and "초장").

The customization application 400 may also provide feedback information (e.g., accuracy, typing speed) corresponding to the user input information to the user through the UI.

The customization application 400 (e.g., the ALM 720) may perform data collection through basic information processing of a keypad, normal touch data processing, and/or typographic error processing, based on the user input information. The customization application 400 (e.g., the ALM 720) may perform touch correction based on the user input information.

Figure 12:
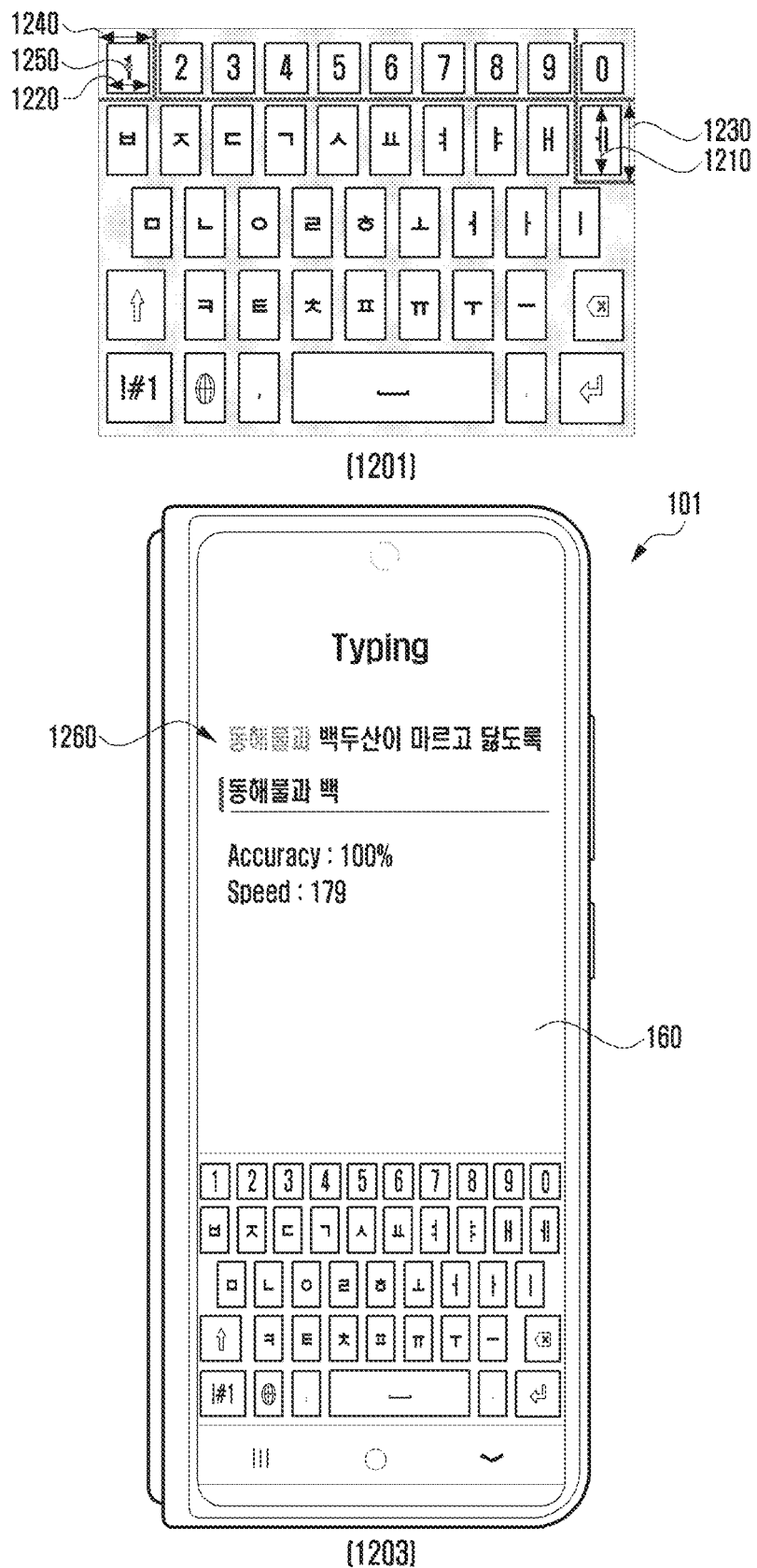
FIG. 12 illustrates an information processing operation for data collection in an electronic device according to an embodiment.

FIG. 12 illustrates an information processing operation for data collection in an electronic device according to an embodiment. Specifically, FIG. 12 illustrates an example of processing basic information of the keypad and normal touch data in the data collection operation of the electronic device 101 (e.g., the customization application 400 or the ALM 720).

Referring to FIG. 12, screen 1201 shows an example of basic information processing of the keypad. When executed, the customization application 400 may store a height 1210 and a width 1220 of each button of the keypad currently set in the electronic device 101. The customization application 400 may obtain and store center coordinates 1250 (e.g., center X and Y coordinates) for each button of the keypad. In addition to the height and width of each button, the customization application 400 may store values related to an actually touchable height 1230 (e.g., a row height including a margin) of each button of the keypad and/or an actually touchable width 1240 (e.g., a column width including a margin) of each button of the keypad. Based on such values of height and/or width including a margin, the customization application 400 may compare actual touch coordinates of the keypad.

The customization application 400 may split (or decompose) input data received from the user in response to words and/or sentences of the sample sentence 1260 into specified units (e.g., character units) and collect them. For example, when a character "동" of the sample sentence 1260 is input, the customization application 400 may decompose the character "동" into consonants/vowels "ㄷ", "ㅗ", and "ㅇ" and then store them. The customization application 400 may decompose words into designated units in order to match consonants/vowels with respective buttons and then store them.

Screen 1203 shows an example of normal touch data processing of the keypad. Whenever a word input by the user in response to the sample sentence 1260 matches the sample sentence 1260, the customization application 400 may compare it with the collected data and store it in a corresponding key map. For example, when the character "dong" is input in response to the sample sentence 1260, the customization application 400 may compare the consonants/vowels "ㄷ", "ㅗ", and "ㅇ" decomposed from the "동" in the sample sentence 1260 with the collected data (e.g., the value (e.g., key code) of a button (e.g., a button touched by the user) based on keypad information (e.g., touch information)). Each button included in the keypad has a key value (e.g., key code), and each key value corresponding to each button may be mapped in the form of a table and stored in a memory. For example, if the key code of the button touched by the user matches "ㄷ" (e.g., "ㄷ"=key code touched by the user), the customization application 400 may store the touch coordinates (e.g., x and y coordinates) touched by the user in KeyMap['ㄷ'].

In screen 1203, the customization application 400 may also provide the user with feedback information (e.g., accuracy: 100%, typing speed: 179) corresponding to the user input information inputted in response to the sample sentence 1260 given through the UI.

Figure 13:
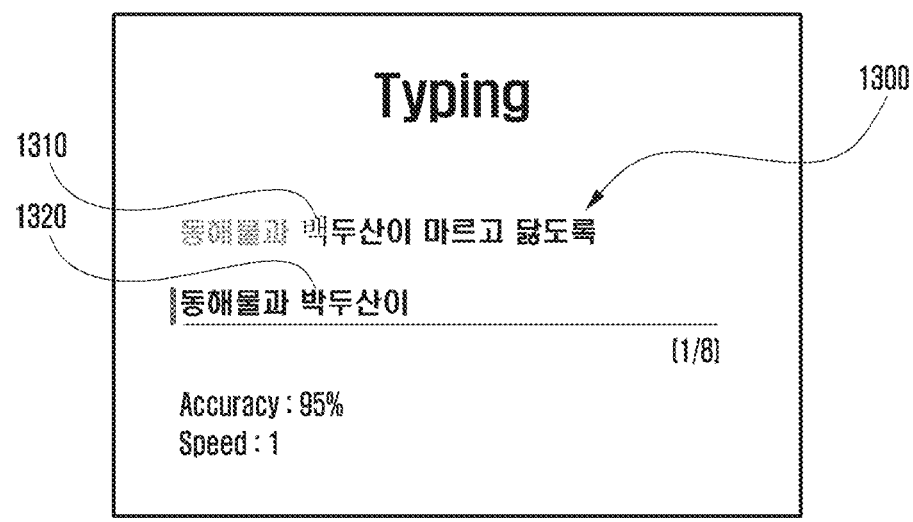
FIG. 13 illustrates an information processing operation for data collection in an electronic device according to an embodiment.

FIG. 13 illustrates an information processing operation for data collection in an electronic device according to an embodiment, Specifically, FIG. 13 illustrates an example of processing typographical error information of the keypad in the data collection operation of the electronic device 101 (e.g., the customization application 400 or the ALM 720).

Referring to FIG. 13, by analyzing a user input based on a given sample sentence, the customization application 400 may determine whether or not a typographical error occurs. When a word input by the user in response to a given sample sentence matches the sample sentence, the customization application 400 may compare it with the collected data and determine whether to store it in a corresponding key map. For example, if a character "비" 1320 is input with respect to a character "백" 1310 of a sample sentence 1300 (e.g., "동해물과 맥누산이 마르고 닳도록"), the customization application 400 may determine it as a typographical error and store only the collected data without performing key code comparison as illustrated in FIG. 12. For example, after a typographical error occurs, the customization application 400 may perform only data collection without comparing button values (e.g., key codes). When the character "비" 1320 is received from the keypad 415 with respect to the character "배" 1310 in the sample sentence as shown, the customization application 400 may determine that it is a typographical error due to inconsistency. When the character "비" 1320 different from the character "배" 1310 in the sample sentence is input, the customization application 400 may store only data of consonants/vowels "ㅂ", "ㅏ", and "ㅣ" decomposed from "배" in the sample sentence any may not store touch coordinates regarding a user's touch.

When there is a re-input for a typographical error from the user, the customization application 400 may compare a distance (e.g., a distance between the 'ㅐ' button and the 'ㅏ' button) between a button (e.g., the 'ㅐ' button) to be actually input and an erroneously input button (e.g., the 'ㅏ' button) in the typographical error (e.g., '비') and recognize even the typographical error as a value to be actually input. For example, if a word (e.g., '비') input by the user is deleted and then a word '배' in the sample sentence is input again, the customization application 400 may compare previously stored data (e.g., "ㅂ", "ㅏ", and "ㅣ") and new data (e.g., "ㅂ", "ㅐ", and "ㅣ"). Based on the comparison result, the customization application 400 may consider it as a situation (e.g., a typographical error) in which the 'ㅐ' button should be actually input, but the 'ㅏ' button was incorrectly input, then calculate a distance between the center coordinates of the 'ㅐ' button and the center coordinates of the 'ㅏ' button, and determine whether to save or delete the touch coordinates of the 'ㅏ' button. For example, assuming that the maximum increasable size (e.g., width and/or height) of the 'ㅐ' button is 120%, the customization application 400 may delete the touch coordinates of the 'ㅏ' button when the touched 'ㅏ' button is 120% or more away from the center coordinates of the 'ㅐ' button, and save the touch coordinates of the 'ㅏ' button in the KeyMap['ㅐ'] when the touched 'ㅏ' button is within 120%. The customization application 400 may store related data to change (e.g., touch correction) the size of the 'ㅐ' button based on the stored touch coordinates. The maximum increasable size of the button may have actually touchable width and/or height (e.g., 1230 and 1240 in FIG. 12) (e.g., the width/height of row/column including margin) of the button.

Figure 14:
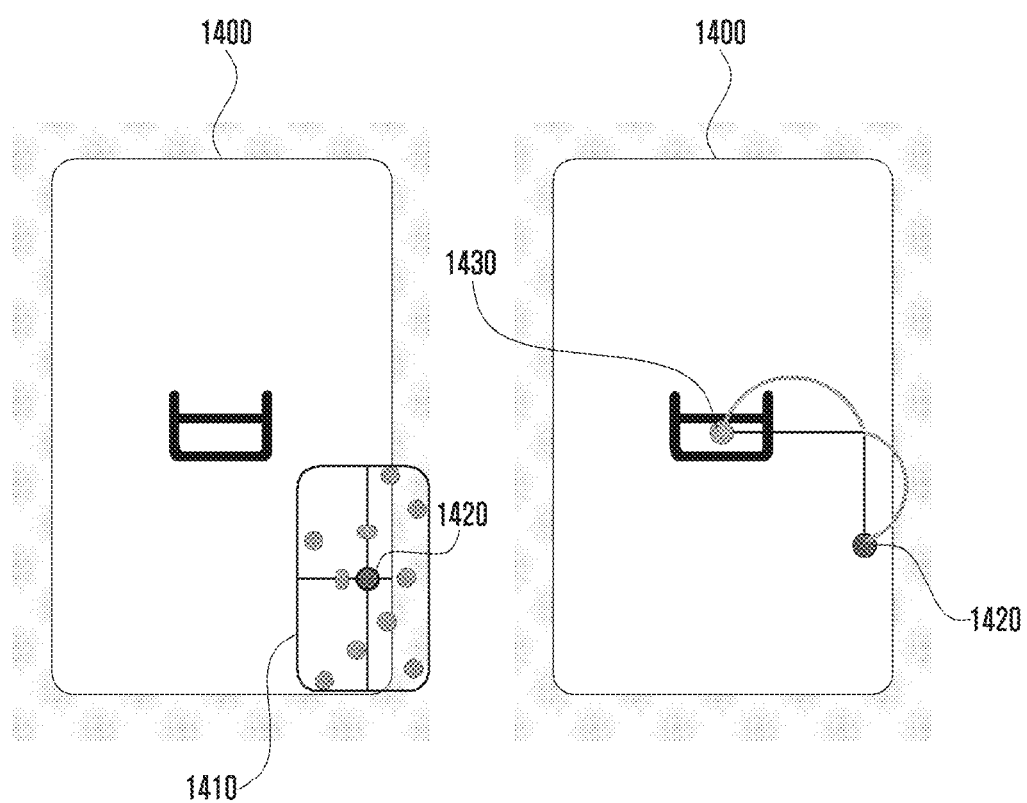
FIG. 14 illustrates a touch correction operation in an electronic device according to an embodiment.

FIG. 14 illustrates a touch correction operation in an electronic device according to an embodiment. Specifically, FIG. 14 illustrates an example of calculating an average value for touch in the touch correction of the electronic device 101 (e.g., the customization application 400 or the ALM 720).

Referring to FIG. 14, the customization application 400 may calculate an average of touch coordinates stored in a key map for each button (e.g., a 'ㅂ' button 1400). The customization application 400 may calculate an average of X and Y coordinates for touch coordinates 1410 collected in the key map of the button 1400 touched by the user. When the user touches the button 1400, the touch coordinates 1420 (e.g., a calculated average value) may deviate rightward in the X coordinate and downward in the Y coordinate compared to the central coordinates 1430 of the button 1400. The customization application 400 may adjust the size of the button 1400 based on the center coordinates 1430 and the touch coordinates 1420 of the button 1400. The customization application 400 may increase the size of and/or moves the position of the button 1400 in the right and downward directions e.g., the lower right direction) to reduce a user's typographical error rate.

Figure 15:
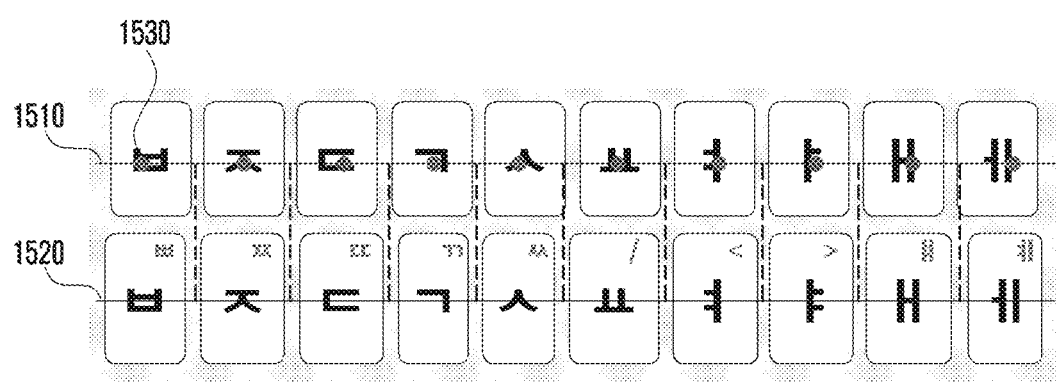
FIG. 15 illustrates a touch correction operation in an electronic device according to an embodiment.

FIG. 15 illustrates a touch correction operation in an electronic device according to an embodiment. Specifically, FIG. 15 illustrates an example of calculating a width and a height for a touch in the touch correction of the electronic device 101 (e.g., the customization application 400 or the ALM 720).

Referring to FIG. 15, element 1510 indicates the central axis of buttons in the same row before resizing, element 1520 indicates the central axis of buttons in the same column after resizing, and element 1530 indicates a center point (or center x and y coordinates) of each button. The buttons of element 1520 may represent an example of being resized from the buttons of element 1510.

The customization application 400 may calculate the width and/or height of each button based on an average value obtained for each button. The customization application 400 may calculate the width and/or height of each button based on a distance (e.g., a left-right distance or an up-down distance) between the center points 1530 of respective buttons. The customization application 400 may calculate the width and/or height of each button in consideration of the center coordinates and touch coordinates of the button touched by the user as in the example of FIG. 14.

Figure 16:
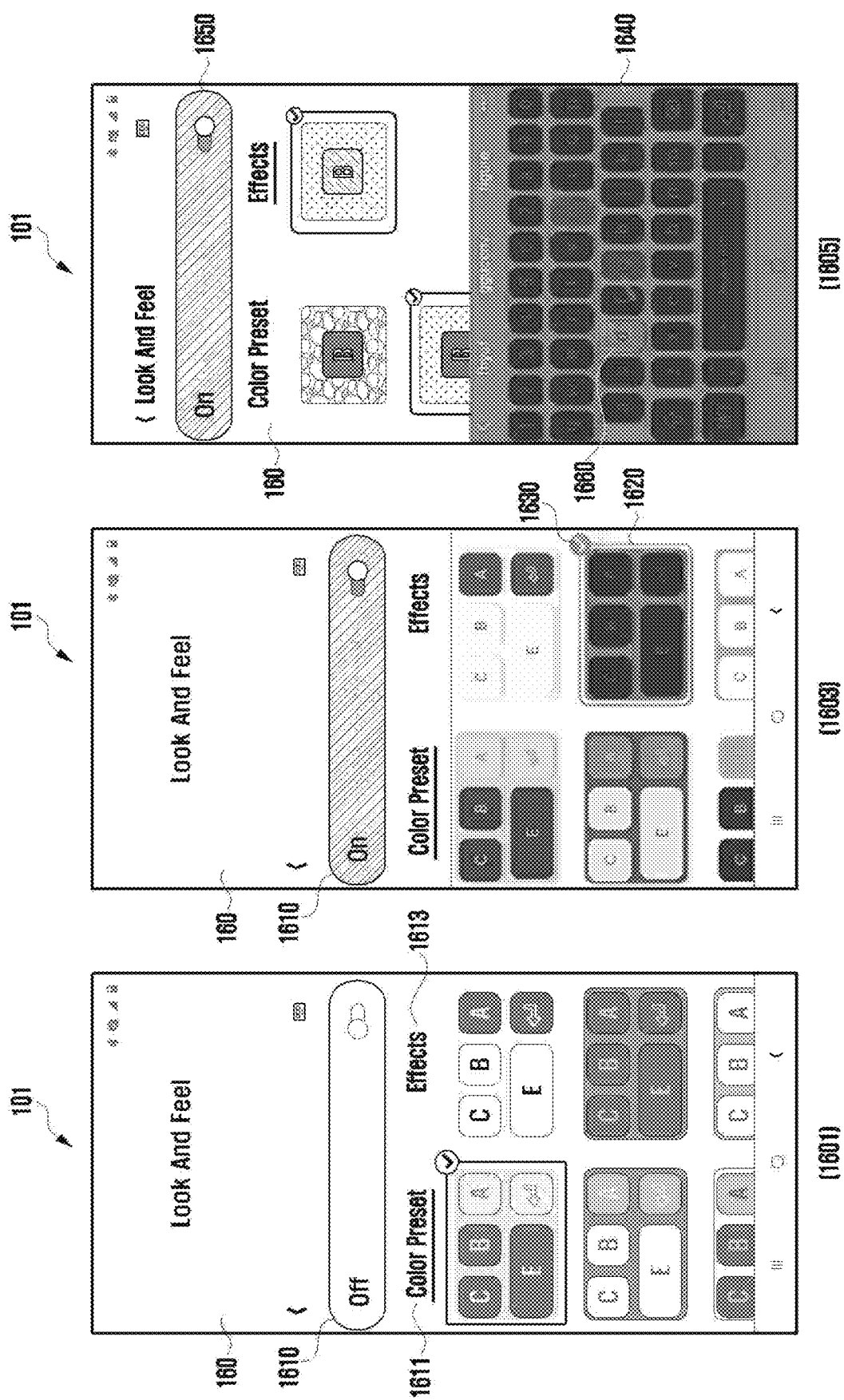
FIG. 16 illustrates a UI for keypad customization in an electronic device according to an embodiment.

FIG. 16 illustrates a UI for keypad customization in an electronic device according to an embodiment. Specifically, FIG. 16 illustrates an example of a UI (or execution screen) of the customization application 400, or an example of an execution screen of the CSM 730 of the customization application 400.

Referring to FIG. 16, the electronic device 101 (e.g., the customization application 400) may provide a UI for changing the color and/or effect of the keypad. The UI includes a first item 1611 (e.g., color preset) related to a color change of the keypad and a second item 1613 for changing an effect (e.g., a keypad button press effect) of the keypad. The UI includes an object 1610 (e.g., an on/off object) for selecting the activation/inactivation of applying a color change and/or effects of the keypad.

Screen 1601 shows an inactive (or off) state in which the first item 1611 related to a color change is selected and the color change is not applied. The inactive state may be set by the object 1610. When the color change is in the inactive state, the customization application 400 may offer the theme (or skin) of the keypad by applying a basic color and/or a gray color without applying a color to the keypad.

Screen 1603 shows an active (or on) state in which a color change is applied to screen 1601. The active state may be set by the object 1610. When the color change is in the active state, the customization application 400 may offer the keypad to which a color is applied as shown. For example, the user may select a theme (or skin) 1620 of a user's desired color combination (e.g., a theme of a combination of a background red color and a button black color) from among given color presets. The customization application 400 may apply a theme (or skin) of the keypad with a color combination corresponding to the user's selected theme (or skin). A related example is shown as a keypad object 1640 in screen 1605. When a theme 1620 specified by the user is selected, the customization application 400 may offer a selection object 1630 for notifying the user that the theme 1620 is selected. The selection object 1630 is not limited to an illustrated example (e.g., a 'V' check icon), and other various type objects (e.g., highlight and/or border), or a combination thereof, capable of notifying about user selection may be used.

Screen 1605 shows a state in which a color change is applied to the screen 1603, a theme 1620 is selected by the user, and a second item 1613 related to a change of an effect keypad button press effect) is selected. The UI includes an object 1650 for selecting the activation/inactivation of applying a color change and/or effects of the keypad. The object 1650 may correspond to the object 1610. When the effect is in the active state, the customization application 400 may apply the effect to at least one button 1660 in the keypad object 1640. For example, the user may select a desired effect (e.g., a green effect) from among given keypad button press effects. The customization application 400 may apply a color corresponding to the user's selected effect as a button press effect. The button 1660 of the keypad object 1640 represents an example that a button press effect is applied. When the user touches a button, the color of the touched button may be output as a color (e.g., green) specified by the user in the button 1660 of the keypad object 1640, and whenever the user selects the button 1660, the button press effect may be offered to the user.

Figure 17A:
FIGS. 17A and 17B illustrate a UI for keypad customization in an electronic device according to an embodiment.
Figure 17B:
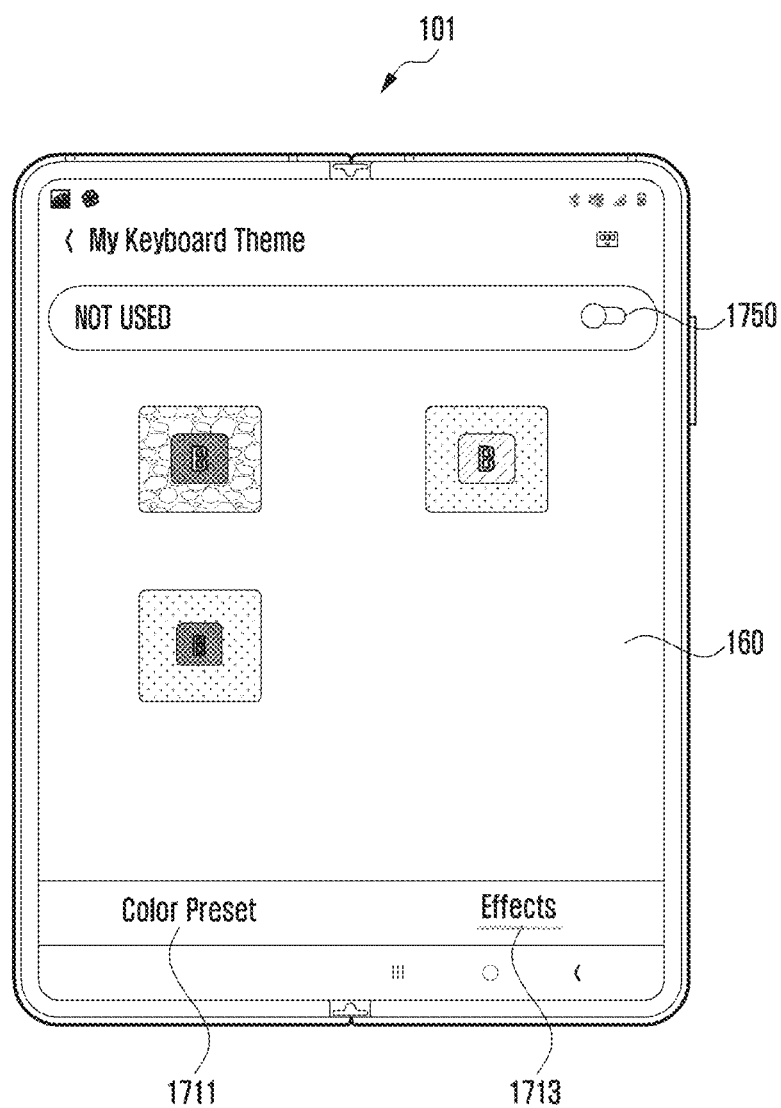

FIGS. 17A and 17B illustrate a UI for keypad customization in an electronic device according to an embodiment. Specifically, FIGS. 17A and 17B illustrate examples of a UI corresponding to FIG. 16, or examples of providing a UI in the electronic device 101 having a form factor different from that of the electronic device 101 of FIG. 16.

Referring to FIGS. 17A and 17B, a foldable electronic device has a form factor (e.g., 320) that includes two display surfaces (e.g., a first display surface and a second display surface) based on one folding axis provides a UI. The UI includes a first item 1711 related to a color change of the keypad and a second item 1713 for changing an effect (e.g., a keypad button press effect) of the keypad, which correspond to FIG. 16. The UI includes an object 1750 for selecting the activation/inactivation of applying a color change and/or effects of the keypad. The UIs illustrated in FIGS. 16, 17A, and 17B may contain substantially the same components, and may be expanded or reduced depending on the size of the display module 160 according to the form factor.

FIG. 18 illustrates a customized keypad in an electronic device according to an embodiment.

Referring to FIG. 18, screen 1801 indicates an example of the existing keypad (hereinafter, referred to as a 'first keypad') that is set by default in the electronic device, and screen 1803 indicates an example of a keypad (hereinafter, referred to as a 'second keypad') customized based on the customization application 400 with respect to the first keypad.

Compared to the layout of the first keypad in the screen 1801, the layout of the second keypad in the screen 1803 contains some customized buttons (e.g., 1810, 1820, 1830, and 1840), For example, in the layout of the second keypad, a button 1810 is changed in the button size, buttons 1820 and 1830 are changed in the button attributes, and a button 1840 is changed in the character imprinted thereon.

Figure 19:
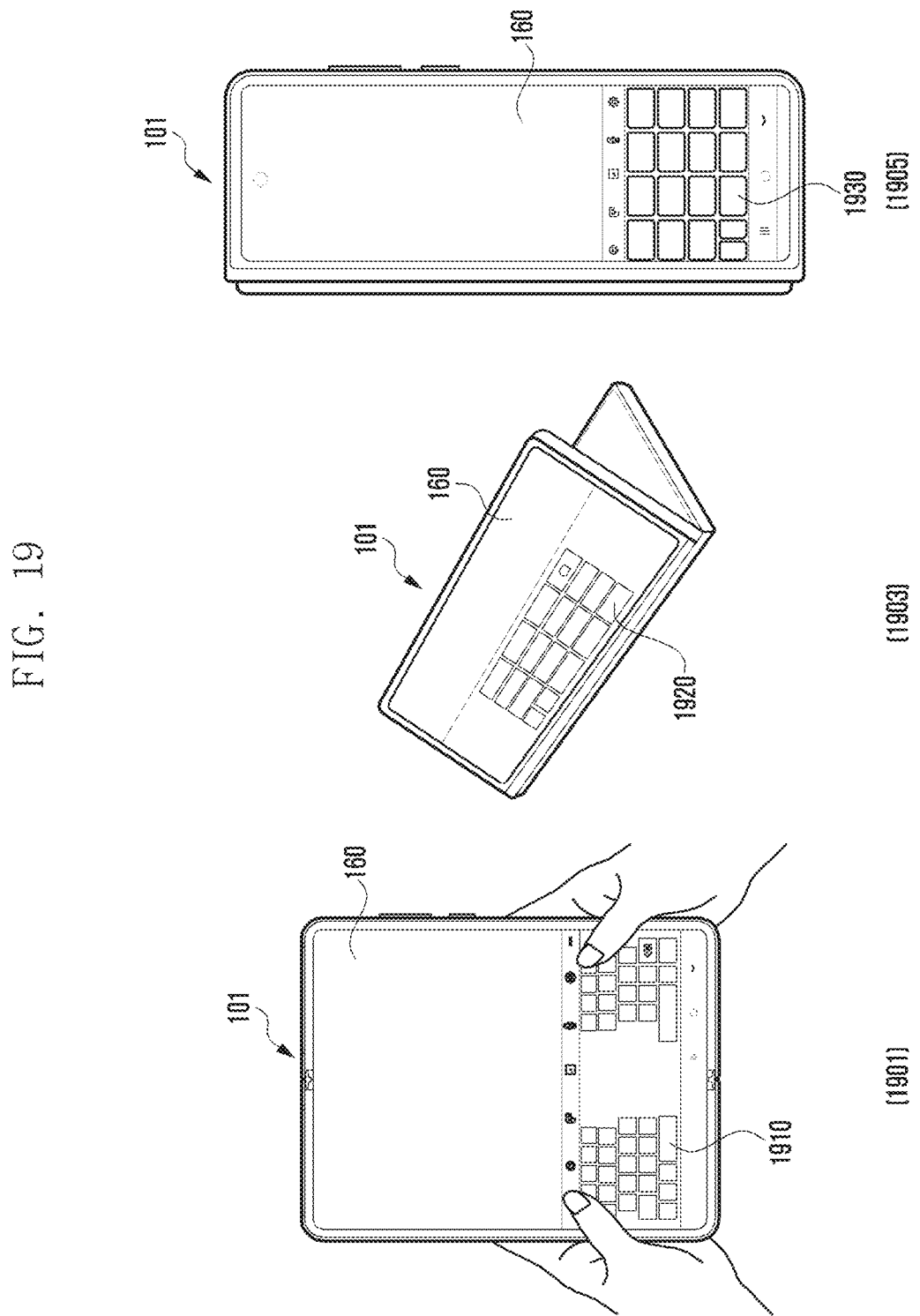
FIGS. 19 and 20 illustrate examples of providing a keypad depending on usage environments of an electronic device according to an embodiment.
Figure 20:
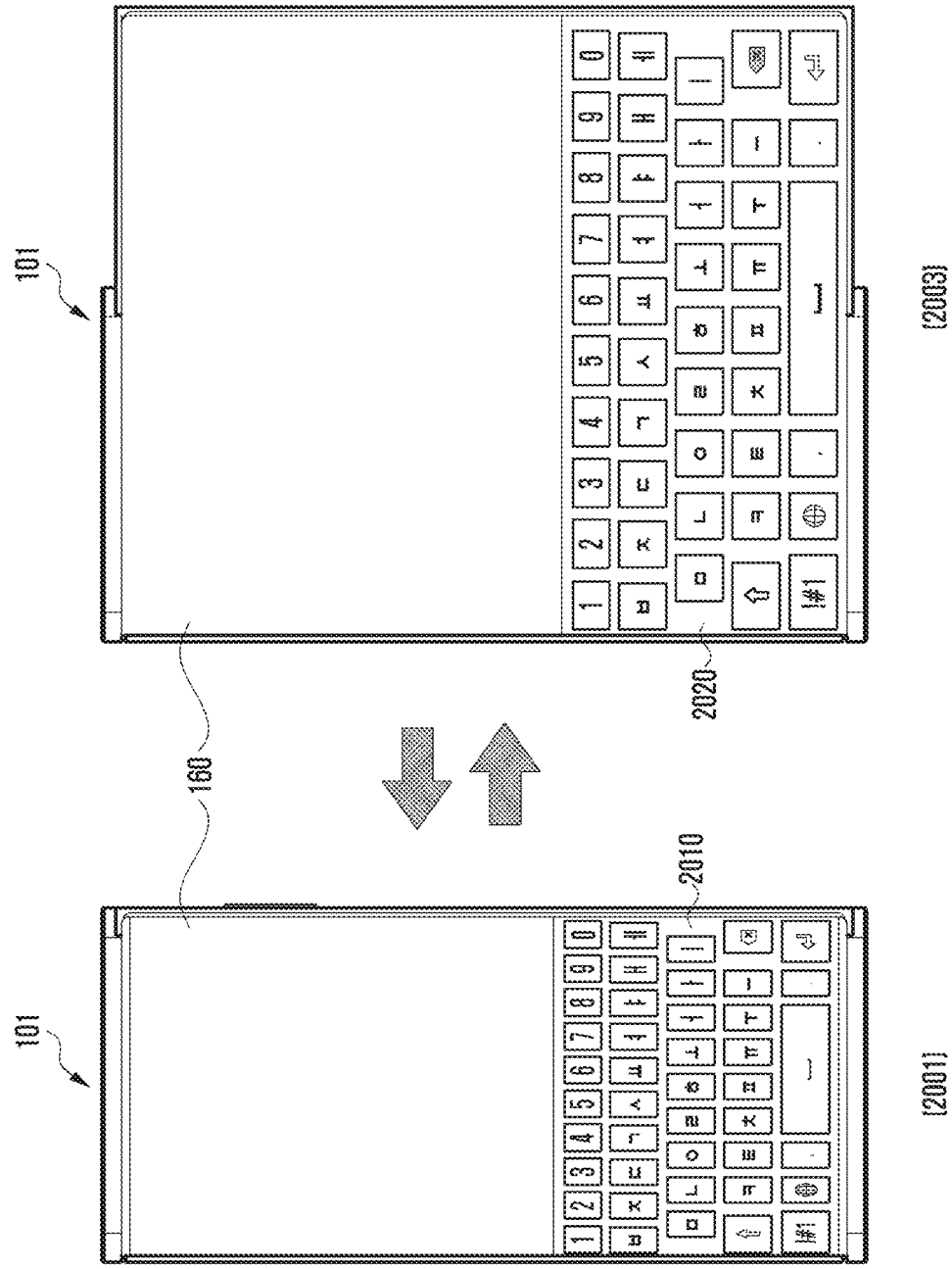

FIGS. 19 and 20 illustrate examples of providing a keypad depending on usage environments of an electronic device according to an embodiment. Specifically, FIGS. 19 and 20 illustrate examples in which a keypad is provided based on various form factors of the electronic device 101.

Referring to FIG. 19, the electronic device 101 has a foldable form factor and operates in a first usage environment 1901 (e.g., an unfolded state), in a second usage environment 1903 (e.g., a flex mode state), and in a third usage environment 1905 (e.g., a folded state). The first usage environment 1901 (e.g., the unfolded state) may refer to a state in which two display surfaces (e.g., first and second display surfaces) are substantially coplanar based on one folding axis. The second usage environment 1903 (e.g., the flex mode state) may refer to a state in which two display surfaces (e.g., the first and second display surfaces) form a certain angle around one folding axis. The third usage environment 1905 (e.g., the folded state) may refer to a state in which two display surfaces (e.g., the first and second display surfaces) are disposed to face each other based on one folding axis and in which a third display surface disposed opposite to at least one of the two display surfaces is visually exposed.

The electronic device 101 may provide a keypad corresponding to each usage environment (or form factor). The electronic device 101 may provide a corresponding keypad (e.g., a customized keypad) based on an operation in (or a change to) the unfolded state 1901 the flex mode state 1903, or the folded state 1905. In response to the first usage environment 1901 (e.g., a display expansion form based on unfolding) of the electronic device 101, the electronic device 101 may provide a first keypad 1910 (e.g., a customized keypad for a both-handed use). In response to the second usage environment 1903 (e.g., a flex mode) of the electronic device 101, the electronic device 101 may provide a second keypad 1920 (e.g., a customized keypad for a flex mode use). In response to the third usage environment 1905 (e.g., a portrait mode use form based on folding) of the electronic device 101, the electronic device 101 may provide a third keypad 1930 (e.g., a customized keypad for a one-handed use).

Referring to FIG. 20, the electronic device 101 has a slidable (or rollable) form factor and operates in a fourth usage environment 2001 (e.g., a display closed state) and in a fifth usage environment 2003 (e.g., a display open state), The electronic device 101 may provide a keypad corresponding to each usage environment (or form factor). According to an embodiment, the electronic device 101 may provide a corresponding keypad (e.g., a customized keypad) based on an operation in (or a change to) the closed state 2001 or the open state 2003. The open state (or unfolded state) may be a state in which the display module 160 is no longer expanded by unrolling (or slide-out). The closed state may be a state in which the display module 160 is not expanded by rolling (or slide-in).

In response to the fourth use environment 2001 (e.g., a display non-expanded state based on the closed state (or a general use environment)) of the electronic device 101, the electronic device 101 may provide a fourth keypad 2010 (e.g., a default keypad). When the state of the electronic device 101 is changed from the fourth use environment 2001 to the fifth use environment 2003 (e.g., a display extended state based on the open state), the electronic device 101 may provide a fifth keypad 2020 (e.g., a customized keypad for an open state use) in response to the state change.

The electronic device 101 is capable of providing a keypad customized for each of various usage environments based on its corresponding form factor (e.g., the foldable form factor or the slidable form factor). The electronic device 101 (e.g., the customization application 400) may customize a layout, a blank space, and/or a button arrangement based on keypad information and/or user input information in response to a usage environment (or form factor) of the electronic device 101, thereby providing a suitable keypad for each usage environment, reducing user's typographical errors, and increasing the usability of input.

Figure 21:
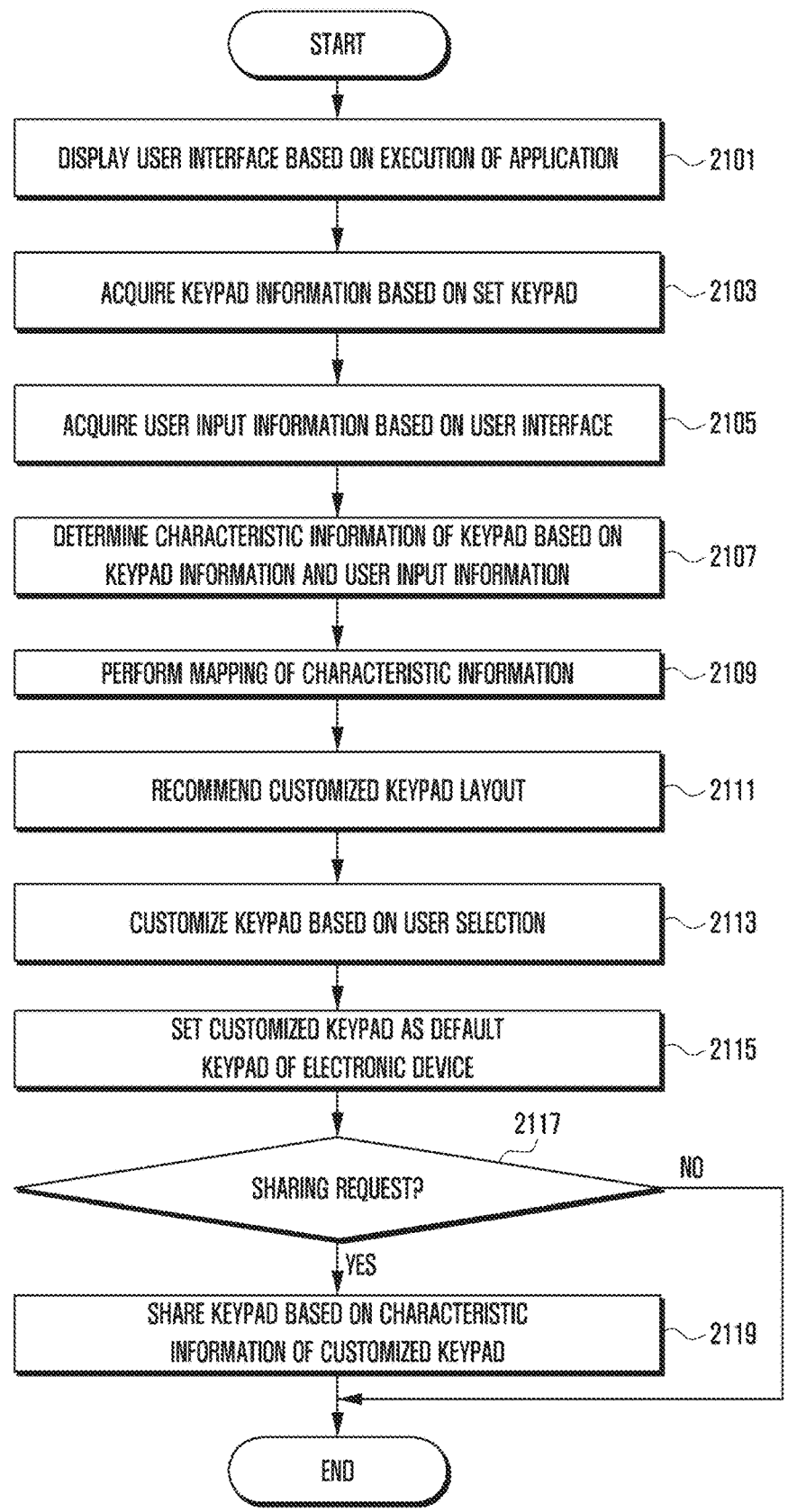
FIG. 21 is a flow diagram illustrating an operating method of an electronic device according to an embodiment.

FIG. 21 is a flow diagram illustrating an operating method of an electronic device according to an embodiment.

The operations shown in FIG. 21 may be performed in various orders without being limited to the illustrated order. Also, more or fewer operations than those illustrated in FIG. 21 may be performed.

Referring to FIG. 21, in step 2101, the processor of the electronic device displays a UI (or execution screen) of an application, based on the execution of the application. The user may perform a user input (e.g., selecting (e.g., touching) an application icon) of executing the customization application 400 for customizing a keypad. Based on the user input, the processor may execute the customization application 400 and control the display module to display a UI (or execution screen) provided by the customization application 400.

In step 2103, the processor acquires keypad information based on the set keypad. The keypad information may include a keypad type, an input pattern (e.g., a typing speed), a keypad typographical error, and a frequently used pattern (e.g., a keypad touch region, a left-handed use pattern, and/or a right-handed use pattern). When the user uses the keypad in the electronic device, the processor may monitor and collect a user's keypad usage pattern (or usage history) (e.g., history information) and use it as first keypad information. The processor may provide a keypad through the customization application 400. Then, if the user uses the keypad provided in the customization application 400, the processor may monitor and collect user input (e.g., input information) using the user's keypad and use it as second keypad information. When the user does not use the keypad in the customization application 400, the processor may acquire keypad information based on the first keypad information. When there is no first keypad information, the processor may acquire keypad information based on the second keypad information. The processor may acquire keypad information based on the first keypad information and the second keypad information.

In step 2105, the processor acquires user input information based on the UI. The user input information may include user customization information input based on the UI of the customization application 400. The processor may acquire the customization information from a user input related to a customization setting provided through the UI.

In step 2107, the processor determines characteristic information for a recommended keypad, based on the acquired information (e.g., the keypad information and/or the user input information). Based at least on the keypad information and/or the user input information the, user customization information), the processor may an operation of determining the characteristic information. The characteristic information may include information for organizing the recommended keypad through keypad customization, such as, for example, themes, skins, attributes, and/or layouts (e.g., a button size and/or a spacing between buttons). The processor may determine the characteristic information such as the theme, skin, attribute, and/or layout (e.g., a button size and/or a button spacing) of the keypad.

In step 2109, the processor performs mapping of the characteristic information. For the recommended keypad, the processor may customize the buttons (or keys) of the existing keypad based on the characteristic information. The processor may generate a key map and perform mapping for one or more buttons (or keys) of the keypad. For example, because the Korean character 'ㅃ' can be entered with 'shift+ㅂ' in the QWERTY keypad and can be entered with 'ㅂ+ㅂ' in the single-vowel keypad, the processor may generate a key map corresponding to each keypad and perform mapping. As another example, in case of a language other than Korean, the processor may generate a key map and perform mapping in real time when processing basic information of the keypad.

The processor may predict and simulate a typographical error rate through learning in order to determine whether a newly mapped, recommended keypad (e.g., a customized keypad or a dynamic keypad) is actually effective. Such learning may include reinforcement learning and/or deep learning. The processor may predict a typographical error rate by modeling various learning patterns and applying the recommended keypad to modeling. In order to determine how much data is required for the recommended keypad to be effective, the processor may analyze, predict, and provide sample sentences or the amount of sample sentences in which all buttons (or keys) can be pressed (or touched). Analyzing may refer to reinforcement learning and/or deep learning based learning models.

In step 2111, the processor recommends (e.g., displays) a customized keypad layout (e.g., a recommended keypad). The processor 120 may provide, through the UI, the recommended keypad in which a first layout of the existing keypad is customized to a second layout to which the characteristic information is applied. The existing keypad may include a keypad set to be used by the user in the electronic device and may be organized based on the first layout set in the existing keypad. The recommended keypad may include a user keypad (e.g., a user-customized keypad) to which the first layout of the existing keypad customized through the UI is added, and may be organized based on the second layout customized according to the characteristic information. The processor may control the display module to display the recommended keypad based on the keypad information and/or the user input information.

In step 2113, the processor performs keypad customization based on a user's selection. While the recommended keypad is displayed on the display module, the processor may further customize the second layout of the recommended keypad based on user input information (e.g., user's additional customization information) related to the recommended keypad.

In step 2115, the processor sets the customized keypad (e.g., the recommended keypad) as a default keypad of the electronic device. For example, based on a user input (e.g., a setting completion input) using the recommended keypad, the processor may change and/or set a currently set keypad to the recommended keypad.

In step 2117, the processor determines whether there is a request for sharing the customized keypad (e.g., the recommended keypad). The processor may receive a user input requesting to share the recommended keypad with an external electronic device.

When the sharing request is not detected in step 2117, the processor terminates the corresponding process.

When the sharing request is detected in step 2117, the processor shares the keypad based on the characteristic information of the customized keypad in step 2119. For example, based on a user input for sharing the recommended keypad, the processor may provide (or transmit) the characteristic information organizing the recommended keypad to an external electronic device through a specified file format and a specified communication scheme.

FIGS. 22A, 22B, 22C, and 22D illustrate examples of an operation of sharing a keypad in an electronic device according to an embodiment.

Referring to FIGS. 22A, 22B, 22C, and 22D the electronic device 101 may perform the keypad sharing operation with at least one external device, based on the mapped characteristic information. For example, the customization application 400 may share the keypad with an external electronic device in various sharing schemes.

Figure 22A:
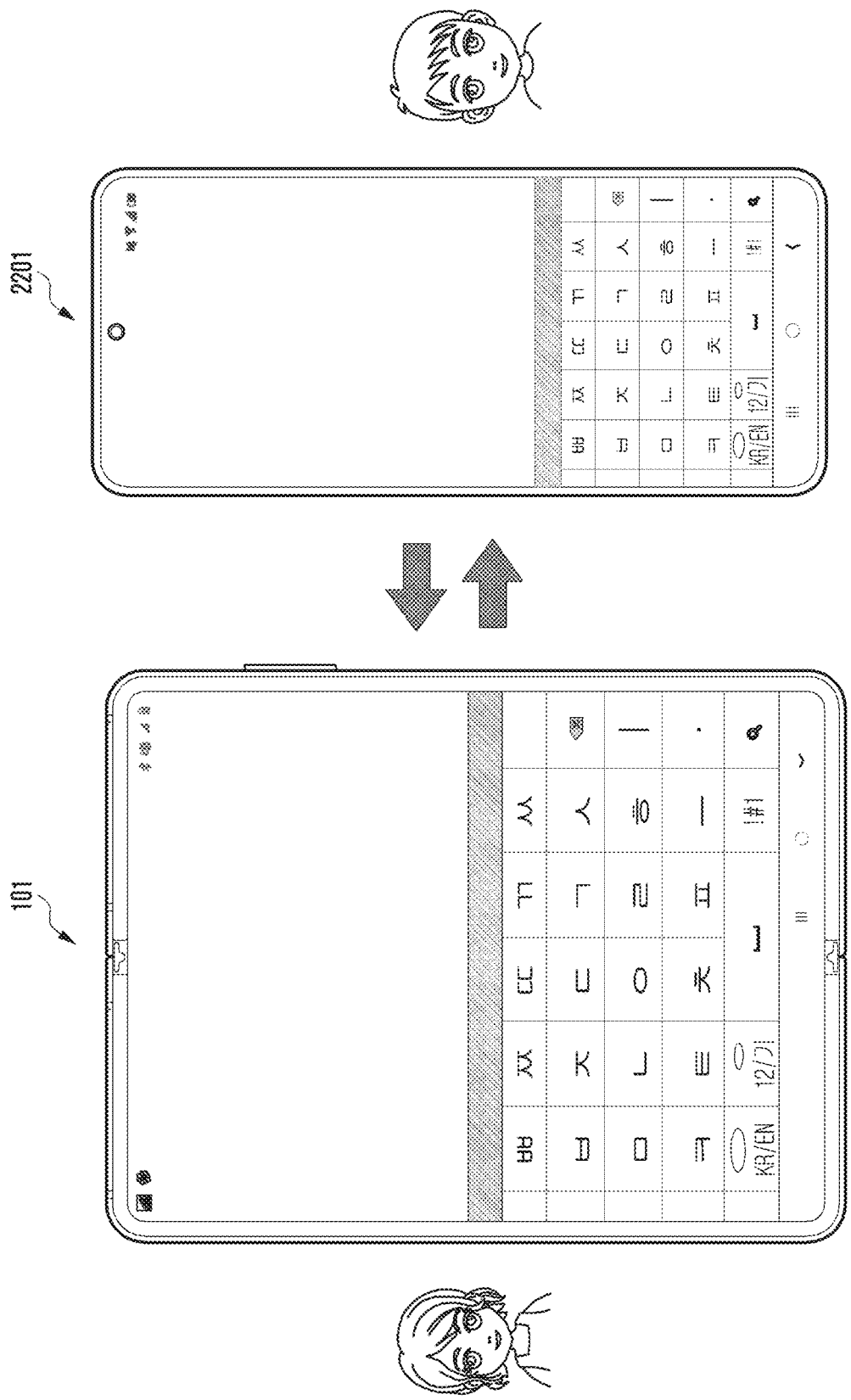
FIGS. 22A, 22B, 22C, and 22D illustrate an operation of sharing a keypad in an electronic device according to an embodiment.
Figure 22B:
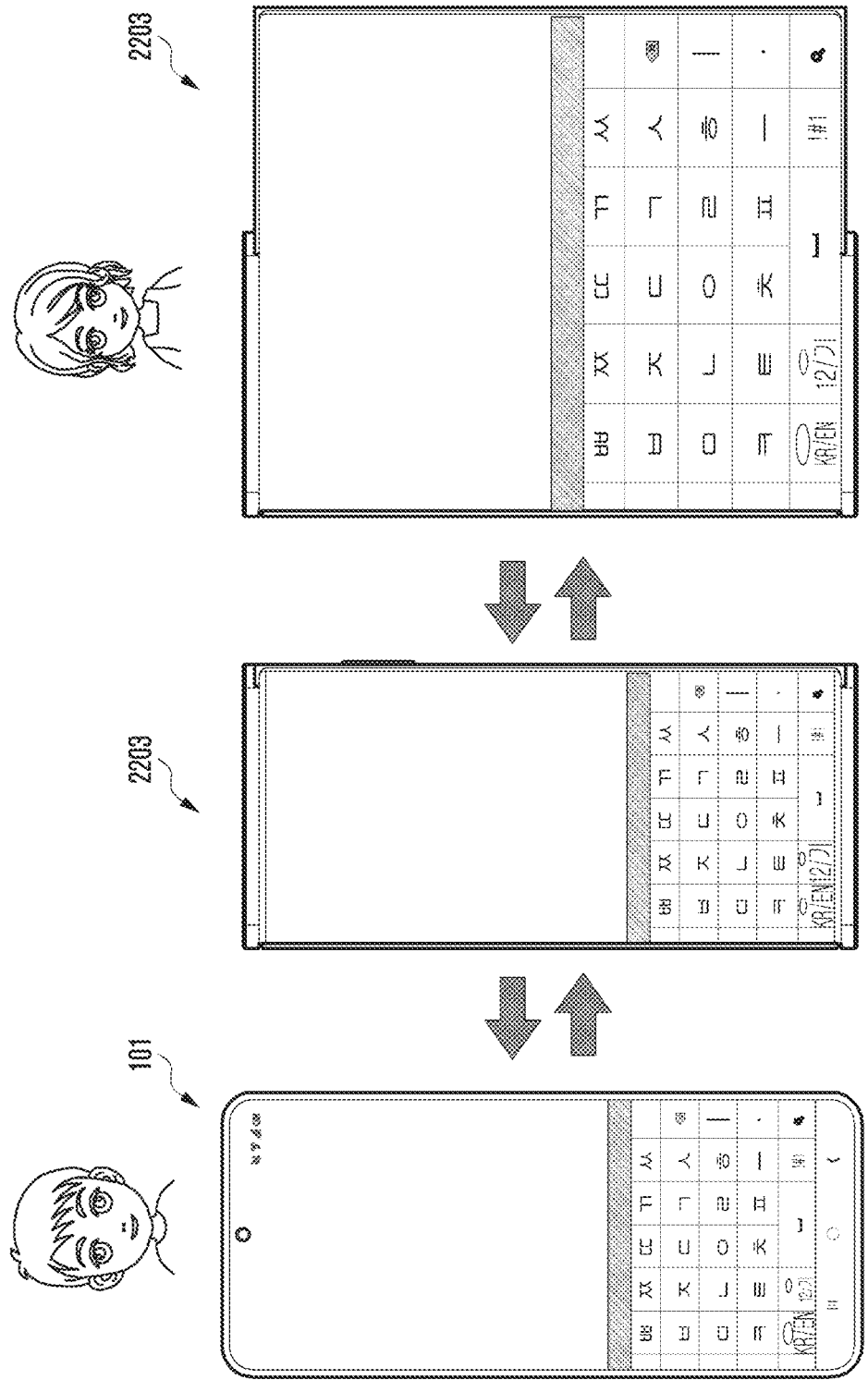

FIGS. 22A and 22B illustrate examples of sharing a keypad between electronic devices having different form factors (e.g., resolution and/or screen size).

Referring to FIG. 22A, a recommended keypad optimized for a large screen of the electronic device 101 is shared with an external electronic device 2201 having a small screen. The electronic device 101 may convert the characteristic information of a keypad e.g., a recommended keypad tailored to an expanded screen in a foldable form factor) customized to correspond to keypad information according to the form factor of the electronic device 101 into a file of a designated format, and share the converted file with the external electronic device 2201 in a specified communication scheme (e.g., out of band (OOB) communication (e.g., short-range wireless communication such as Bluetooth, BLE, NFC, and/or Wi-Fi)).

When sharing the recommended keypad with the external electronic device 2201, the electronic device 101 may correct the characteristic information of the recommended keypad based on a keypad (or form factor information) of the external electronic device 2201 and then provide it to the external electronic device 2201. When establishing a connection with the external electronic device 2201, the electronic device 101 may receive the keypad (or form factor information) of the external electronic device 2201. Upon receiving the characteristic information from the electronic device 101, a customization application of the external electronic device 2201 may correct the received characteristic information based on the keypad information of the external electronic device 2201. The keypad sharing operation illustrated in FIG. 22A may be the same as a keypad sharing operation from the external electronic device 2201 to the electronic device 101.

Referring to FIG. 22B, a recommended keypad optimized for a small screen of the electronic device 101 is shared with an external electronic device 2203 having a large screen. The electronic device 101 may share the characteristic information of a keypad (e.g., a recommended keypad tailored to a small screen) customized to correspond to keypad information according to the form factor of the electronic device 101 with the external electronic device 2203 in a specified communication scheme (e.g., OOB communication). When sharing the recommended keypad with the external electronic device 2203, the electronic device 101 may correct the characteristic information of the recommended keypad based on a keypad (or form factor information) of the external electronic device 2203 and then provide it to the external electronic device 2203. When establishing a connection with the external electronic device 2203, the electronic device 101 may receive the keypad (or form factor information) of the external electronic device 2203.

Upon receiving the characteristic information from the electronic device 101, a customization application of the external electronic device 2203 may correct the received characteristic information based on the keypad information of the external electronic device 2203. The keypad sharing operation illustrated in FIG. 22B may be the same as a keypad sharing operation from the external electronic device 2203 to the electronic device 101.

Figure 22C:
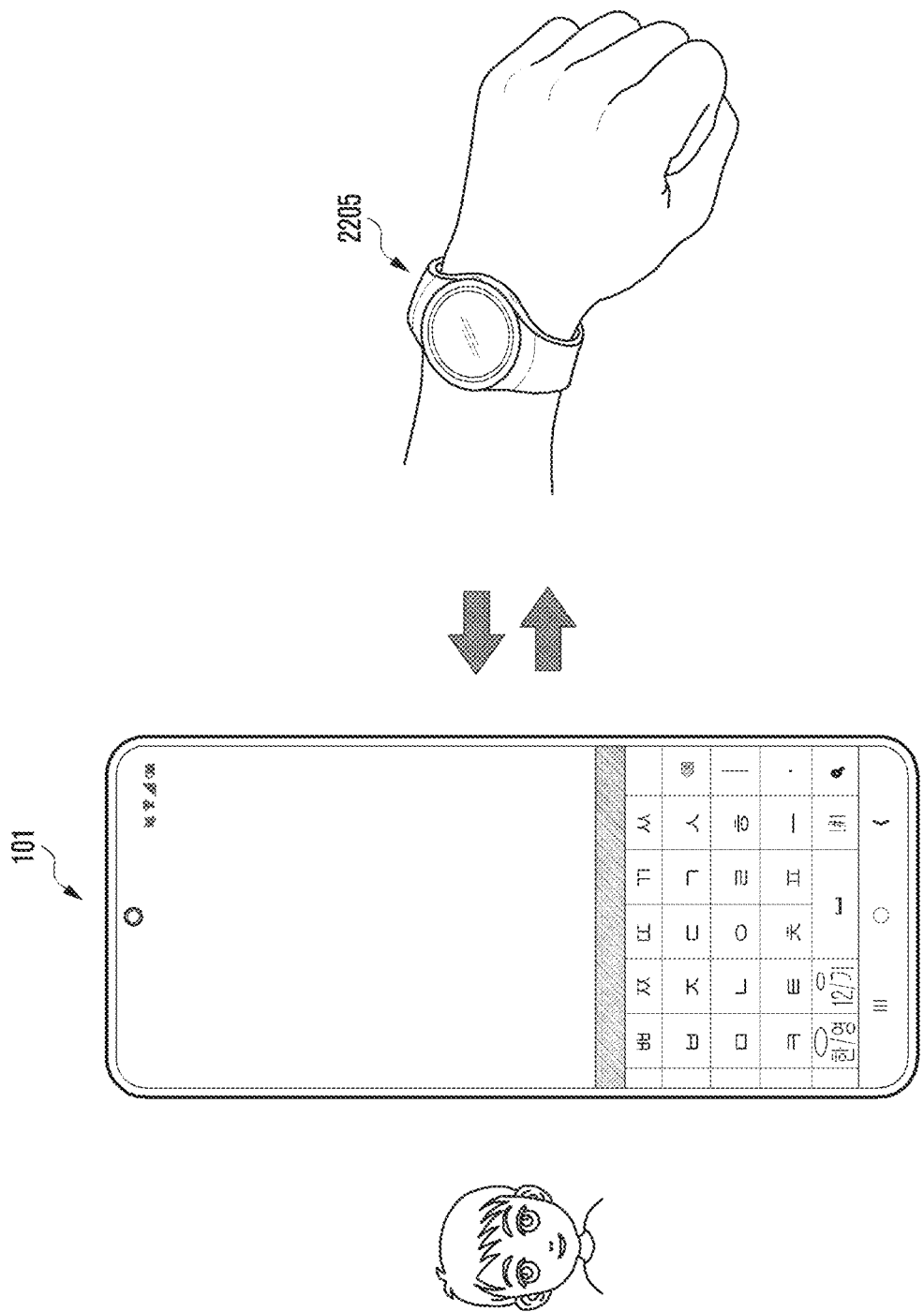

Referring to FIG. 22C, a keypad is shared between electronic devices of different types. The electronic device 101 may share the characteristic information of a keypad customized to correspond to keypad information according to the form factor of the electronic device 101 with the wearable device 2205 in a specified communication scheme (e.g., OOB communication). When sharing the recommended keypad with the wearable device 2205, the electronic device 101 may correct the characteristic information of the recommended keypad based on a keypad (or form factor information) of the wearable device 2205 and then provide it to the wearable device 2205. When establishing a connection with the wearable device 2205, the electronic device 101 may receive the keypad (or form factor information) of the wearable device 2205.

The wearable device 2205 may not easily customize the keypad due to restrictions on the size of the form factor and/or the size of the screen. Therefore, the user may generate a keypad to be used in the wearable device 2205 by using the electronic device 101 based on interaction between the electronic device 101 and the wearable device 2205, and allow the generated keypad to be shared with the wearable device 2205. Upon receiving the characteristic information from the electronic device 101, the wearable device 2205 may provide a keypad of the wearable device 2205.

Figure 22D:
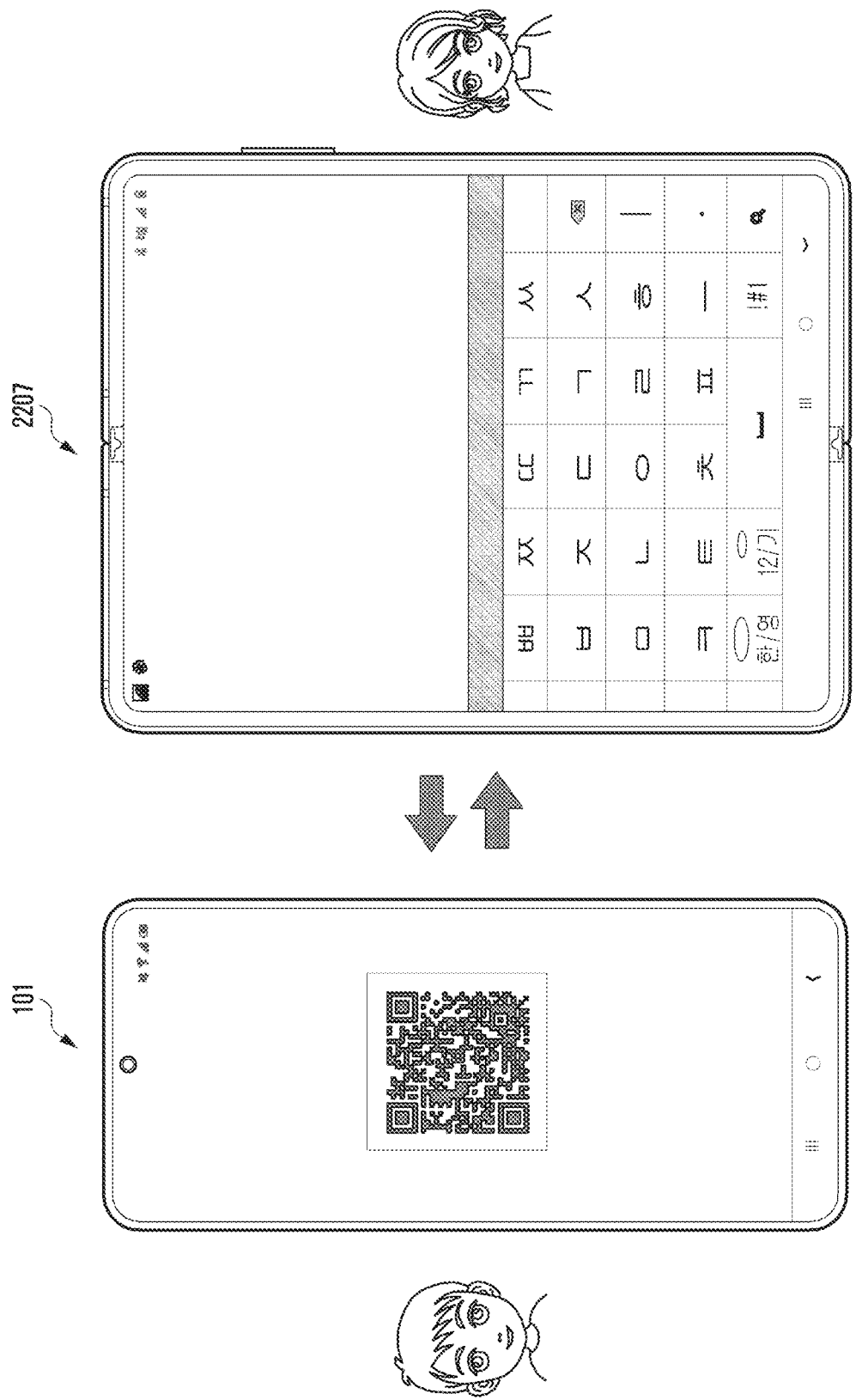

Referring to FIG. 22D, a recommended keypad is shared between the electronic device 101 and an external electronic device 2207 in a communication scheme other than the OOB communication. For example, the electronic device 101 may provide characteristic information corresponding to the recommended keypad as a QR code. The electronic device 101 may share characteristic information of the QR code with the external electronic device 2207 based on interaction (e.g., QR code transmission/reception operations) with the external electronic device 2207. Upon receiving the characteristic information from the electronic device 101, a customization application of the external electronic device 2207 may correct the received characteristic information based on keypad information of the external electronic device 2207.

Figure 23A:
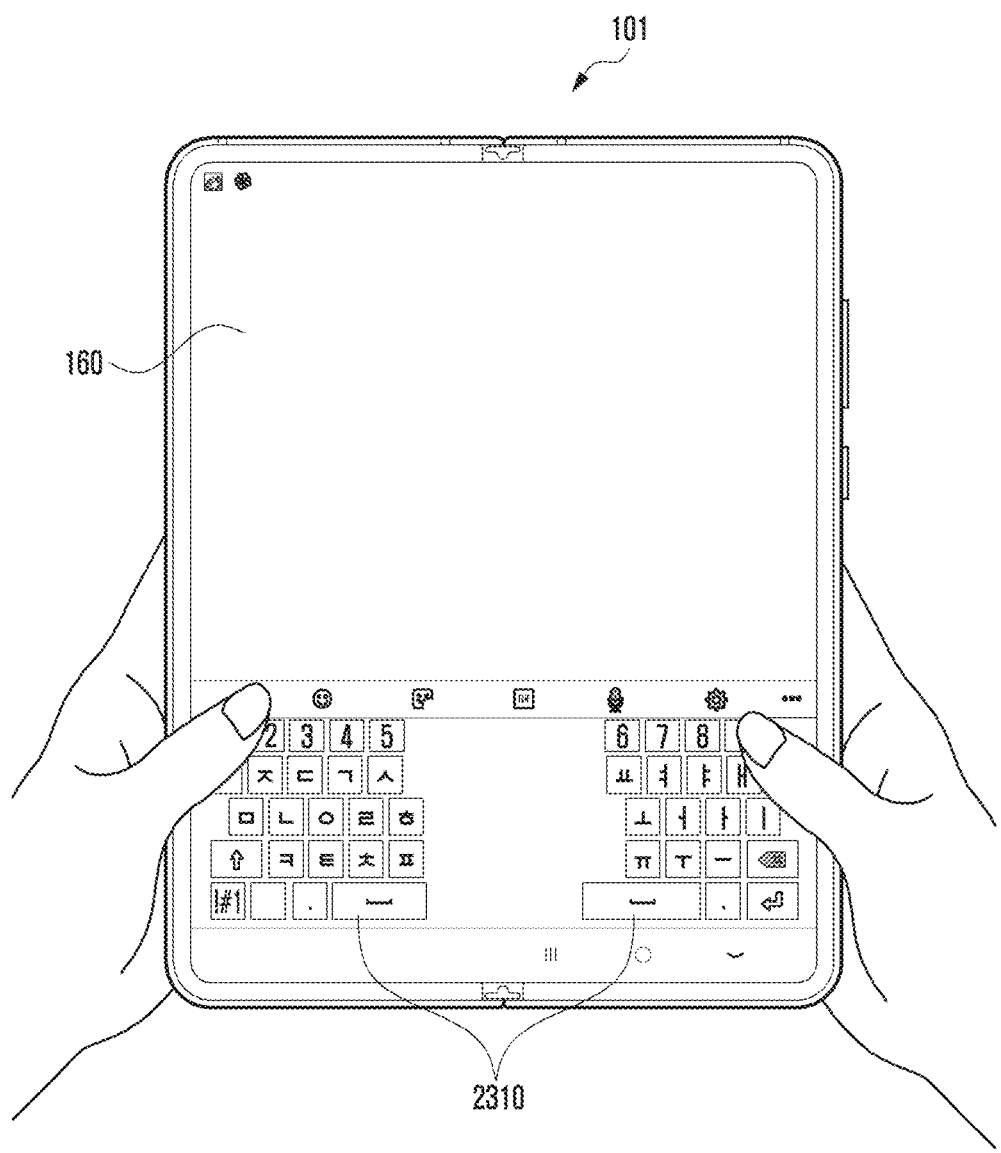
FIGS. 23A and 23B illustrate examples of operating a keypad in an electronic device according to an embodiment.
Figure 23B:
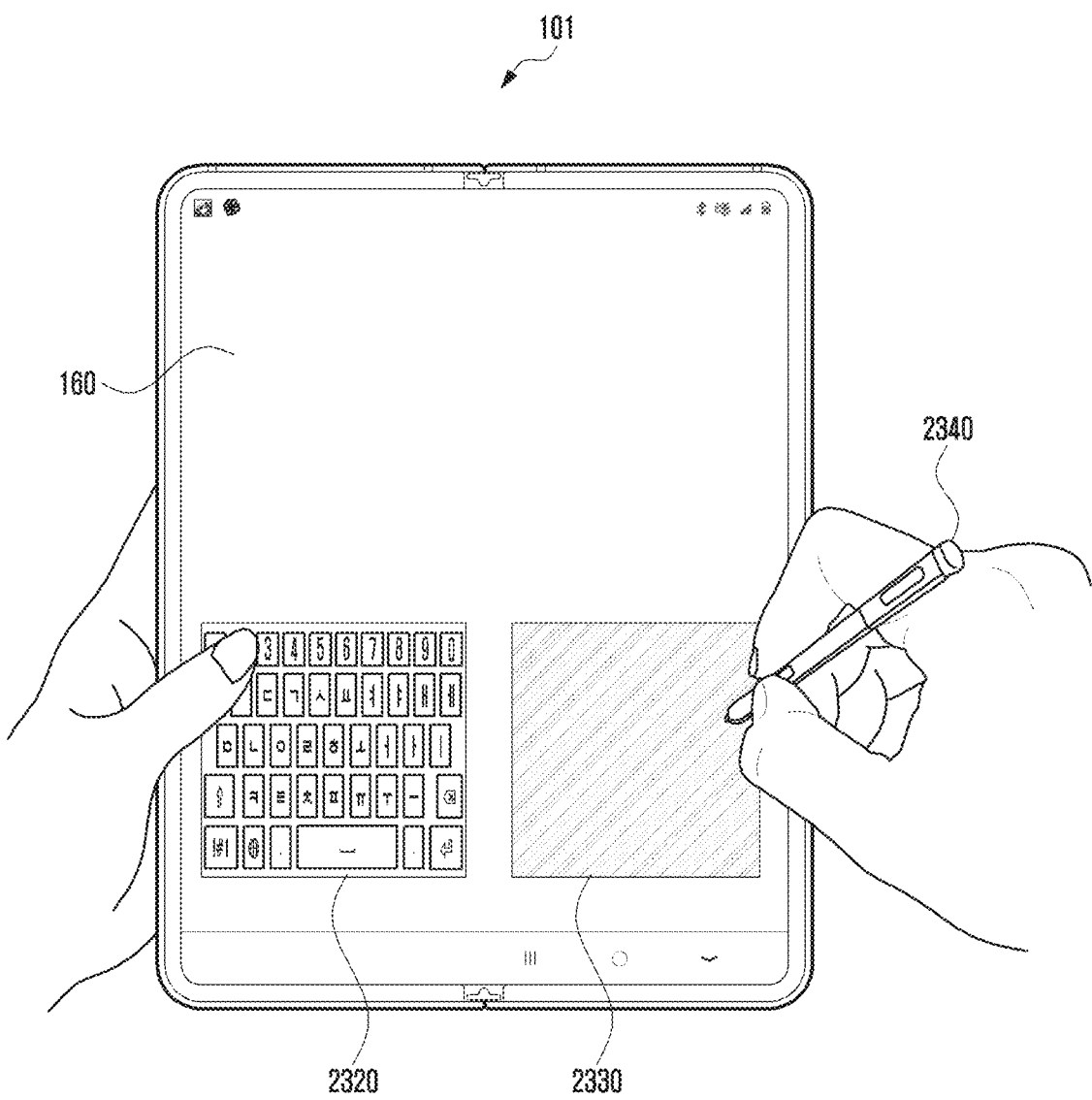
Figure 24:
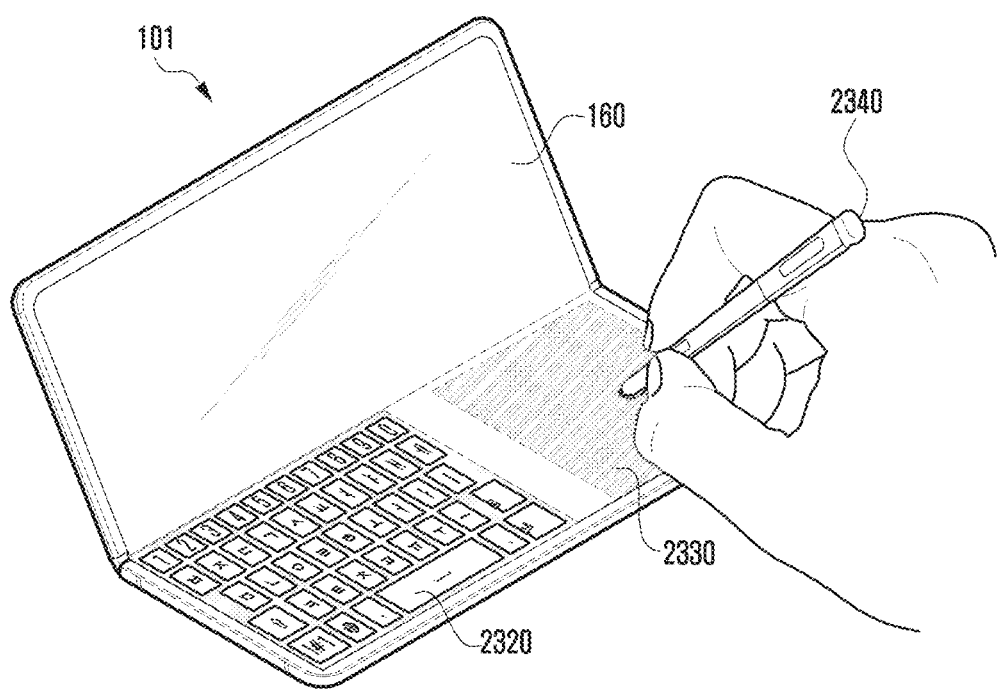
FIG. 24 illustrates an example of operating a keypad in an electronic device according to an embodiment.

FIGS. 23A, 23B, and 24 illustrate examples of operating a keypad in an electronic device according to an embodiment. Specifically, FIGS. 23A and 23B illustrate an example of providing a keypad according to interaction between the electronic device 101 and an electronic pen 2340 (or a digital pen) (e.g., a stylus pen), and FIG. 24 illustrates an example of operating a keypad according to interaction between the electronic device 101 and the electronic pen 2340.

As illustrated in FIGS. 23A, 23B, and 24, the electronic device 101 may change the keypad, based on an event (e.g., hover) of the electronic pen 2340.

Referring to FIG. 23A, the electronic device 101 may display a keypad 2310 (e.g., a keypad customized to correspond to a both-handed mode in the unfolded state) through the display module 160 in the unfolded state. In response to detecting an event by the electronic pen 2340 while displaying the recommended keypad 2310, the electronic device 101 may change the keypad 2310 to a keypad 2320 customized to correspond to a one-handed mode (e.g., a left-handed mode) as illustrated in FIGS. 23B and/or 24, and then provide the keypad 2320 to one side (e.g., the left side) of the display module 160.

The electronic device 101 may provide a pad area 2330 for the electronic pen 2340 in a region (e.g., the other side) symmetrical (or opposite) to a region (e.g., one side) where the keypad 2320 is disposed. In response to detecting a hover event (or proximity event) of the electronic pen 2340 while displaying the keypad 2310, the electronic device 101 may change the both-handed mode to the one-handed. mode and an input mode of the electronic pen 2340. When changing to a keypad of the one-handed mode, the electronic device 101 may provide a keypad (e.g., a keypad having a layout customized to minimize a user's erroneous input in the one-handed. mode) customized in advance to correspond to the one-handed mode according to keypad information and/or user input information.

An operating method performed by an electronic device according to an embodiment of the disclosure may include displaying a UI based on execution of an application, acquiring keypad information and/or user input information from a user input related to a first keypad of the UI, determining characteristic information for a second keypad based on the acquired information, organizing the second keypad based on the characteristic information, and displaying the second keypad through the UI.

The keypad information may include a keypad type, an input pattern, a keypad typographical error, and a frequently used pattern, and the user input information may include user's customization information inputted based on the UI.

The keypad information may be acquired based at least on history information about a user's usage of the first keypad and/or input information about a user input using a keypad provided through the UI.

The characteristic information may include information related to a theme, a skin, an attribute, and/or a layout related to keypad customization.

The displaying may include providing through the UI the second keypad in which a first layout of the first keypad is customized to a second layout based on the characteristic information.

The method may include setting the second keypad as a default keypad of the electronic device, and sharing the second keypad with an external electronic device based on a user input requesting sharing of the second keypad.

The sharing may include sharing the characteristic information organizing the second keypad with the external electronic device through a specified file format and a specified communication scheme.

The first keypad may include an existing keypad set based on a first layout to be used by a user in the electronic device, and the second keypad may include a keypad in which the first layout of the first keypad is customized to a second layout through the UI, and added as a user keypad.

The embodiments of the disclosure described in the specification and drawings are merely provided for specific examples in order to easily explain the technical contents according to the embodiments of the disclosure and help the understanding of the embodiments of the disclosure, and are not intended to limit the scope of the embodiments of the disclosure. Therefore, the scope of various embodiments of the disclosure should be construed to include all changes or modifications derived from the technical ideas of various embodiments of the disclosure in addition to the embodiments disclosed herein.

According to an electronic device and an operating method thereof according to an embodiment, it is possible to customize a keypad of the electronic device depending on a user's usage environment. By supporting a free customization of the keypad (or keyboard) (e.g., customizing a layout, color, and/or effect) set by default in the electronic device depending on the user's usage environment, it is possible to provide a keypad with a user-defined new layout in the electronic device.

Accordingly, the electronic device may learn a user's pattern corresponding to a user's keypad usage and provide a keypad having a user-customized layout based on at least one of the user's pattern and a user's setting. The electronic device may provide a keypad optimized depending on a user's usage environment, thereby solving any inconvenience of using the existing keypad, and improving user's keypad usability, convenience, and/or accuracy.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
   a display;
   a processor; and
   a memory,
   wherein the memory stores instructions that, when executed, cause the processor to:
   display a first user interface (UI) based on execution of an application for customizing a first keypad in the electronic device, wherein the first UI includes a first item for switching to a second UI related to keypad information acquisition and a second item for switching to a third UI related to customization information acquisition,
   display the second UI for acquiring the keypad information related to a second keypad based on a selection of the first item,
   acquire the keypad information based on a first user input on the displayed second keypad of the second UI,
   display the third UI for acquiring the customization information related to the second keypad based on a selection of the second item,
   acquire the customization information based on a second user input on at least one item for setting a theme and an effect of the third UI, wherein the customization information includes theme information related to a color combination of the second keypad and effect information related to a keypad button press effect,
   determine characteristic information for configuring a third keypad based on the keypad information and the customization information,
   change a first layout of the second keypad to a second layout of the third keypad to which the characteristic information is applied, and
   display the third keypad as a recommended keypad on the display.

2. The electronic device of claim 1, wherein the keypad information includes at least one of a keypad type, an input pattern, a keypad typographical error, a frequently used pattern, or a layout.

3. The electronic device of claim 2, wherein the keypad information is acquired based on at least one of history information about a user's usage of the second keypad or input information about a user input using the second keypad provided through the second UI.

4. The electronic device of claim 3, wherein the instructions further cause the processor to:
generate a customized keypad layout based on at least one of the history information or the input information, and
organize the third keypad based on user input information related to the generated customized keypad layout.

5. The electronic device of claim 1, wherein the customization information includes a user's customization information inputted based on the third UI.

6. The electronic device of claim 1, wherein the instructions further cause the processor to map a key map for each keypad.

7. The electronic device of claim 1, wherein the instructions further cause the processor to provide, through the first UI, the third keypad in which the first layout of the second keypad is customized to the second layout based on the characteristic information.

8. The electronic device of claim 1, wherein the instructions further cause the processor to:
share the third keypad with an external electronic device based on a user input requesting sharing of the third keypad.

9. The electronic device of claim 8, wherein the instructions further cause the processor to share the characteristic information organizing the third keypad with the external electronic device through a specified file format and a specified communication scheme.

10. The electronic device of claim 1, wherein the second keypad includes an existing keypad set based on the first layout to be used by a user in the electronic device, and
wherein the third keypad includes a keypad in which the first layout of the second keypad is customized to the second layout through the first UI.

11. A method performed by an electronic device, the method comprising:
displaying a first user interface (UI) based on execution of an application for customizing a first keypad in the electronic device, wherein the first UI includes a first item for switching to a second UI related to keypad information acquisition and a second item for switching to a third UI related to customization information acquisition;
displaying the second UI for acquiring the keypad information related to the second keypad based on a selection of the first item;
acquiring the keypad information based on a first user input on the displayed second keypad of the second UI;
displaying the third UI for acquiring the customization information related to the second keypad based on a selection of the second item;
acquiring customization information based on a second user input on at least one item for setting a theme and an effect of the third UI, wherein the customization information includes theme information related to a color combination of the second keypad and effect information related of a keypad button press effect;
determining characteristic information for configuring a third keypad based on the keypad information and the customization information;
changing a first layout of the second keypad to a second layout of the third keypad to which the characteristic information is applied; and
displaying the third keypad as a recommended keypad on a display.

12. The method of claim 11, wherein the keypad information includes at least one of a keypad type, an input pattern, a keypad typographical error, a frequently used pattern, or a layout, and
wherein the customization information includes a user's customization information inputted based on the third UI.

13. The method of claim 12, wherein the keypad information is acquired based on at least one of history information about a user's usage of the second keypad or input information about a user input using the second keypad provided through the second UI.

14. The method of claim 11, wherein displaying the third keypad includes providing through the first UI the third keypad in which the first layout of the second keypad is customized to the second layout based on the characteristic information.

15. The method of claim 11, further comprising:
sharing the third keypad with an external electronic device based on a user input requesting sharing of the third keypad.

16. The method of claim 15, wherein sharing the characteristic information for configuring the third keypad includes sharing the characteristic information organizing the third keypad with the external electronic device through a specified file format and a specified communication scheme.

17. The method of claim 11, wherein the second keypad includes an existing keypad set based on the first layout to be used by a user in the electronic device, and
wherein the third keypad includes a keypad in which the first layout of the second keypad is customized to the second layout through the first UI.

18. A non-transitory computer-readable recording medium storing instructions that, when executed by a processor of an electronic device including a display, cause the processor to execute operations of:
displaying a first user interface (UI) based on execution of an application for customizing a first keypad in the electronic device, wherein the first UI includes a first item for switching to a second UI related to keypad information acquisition and a second item switching to a third UI related to customization information acquisition;
displaying the second UI for acquiring the keypad information related to the second keypad based on a selection of the first item;
acquiring the keypad information based on a first user input on the displayed second keypad through the second UI;
displaying the third UI for acquiring the customization information related to the second keypad based on a selection of the second item;
acquiring customization information based on a second user input on at least one item for setting a theme and an effect of the third UI, wherein the customization information includes theme information related to a color combination of the second keypad and effect information related of a keypad button press effect;
determining characteristic information for configuring a third keypad based on the keypad information and the customization information;
changing a first layout of the second keypad to a second layout of the third keypad to which the characteristic information is applied; and displaying the third keypad as a recommended keypad on a display.

* * * * *